United States Patent
Chen et al.

(10) Patent No.: US 10,480,809 B2
(45) Date of Patent: Nov. 19, 2019

(54) CUSTOMIZED CONTROL METHOD AND SYSTEM FOR AIR CONDITIONER OPERATION MODE

(71) Applicant: GD MIDEA AIR-CONDITIONING EQUIPMENT CO., LTD., Foshan, Guangdong (CN)

(72) Inventors: Jianchang Chen, Guangdong (CN); Xiangbing Zeng, Guangdong (CN)

(73) Assignee: GD MIDEA AIR-CONDITIONING EQUIPMENT CO., LTD., Foshan (CN)

( * ) Notice: Subject to any disclaimer, the term of this patent is extended or adjusted under 35 U.S.C. 154(b) by 426 days.

(21) Appl. No.: 15/110,396

(22) PCT Filed: Sep. 25, 2014

(86) PCT No.: PCT/CN2014/087411
§ 371 (c)(1),
(2) Date: Jul. 7, 2016

(87) PCT Pub. No.: WO2015/109865
PCT Pub. Date: Jul. 30, 2015

(65) Prior Publication Data
US 2016/0334125 A1    Nov. 17, 2016

(30) Foreign Application Priority Data
Jan. 26, 2014    (CN) .......................... 2014 1 0038900

(51) Int. Cl.
*F24F 11/52* (2018.01)
*F24F 11/62* (2018.01)
(Continued)

(52) U.S. Cl.
CPC .............. *F24F 11/62* (2018.01); *F24F 11/30* (2018.01); *G05B 15/02* (2013.01);
(Continued)

(58) Field of Classification Search
None
See application file for complete search history.

(56) References Cited

U.S. PATENT DOCUMENTS

| 7,028,912 B1 | 4/2006 | Rosen | |
| 2003/0046557 A1* | 3/2003 | Miller | G06F 21/32 |
| | | | 713/186 |

(Continued)

FOREIGN PATENT DOCUMENTS

| CN | 101245936 A | 8/2008 |
| CN | 102022803 A | 4/2011 |

(Continued)

OTHER PUBLICATIONS

Search Report of counterpart European Patent Application No. 14879605.5 dated Nov. 29, 2017.

(Continued)

*Primary Examiner* — Thomas C Lee
*Assistant Examiner* — Gary Collins
(74) *Attorney, Agent, or Firm* — Anova Law Group, PLLC

(57) ABSTRACT

A customized control method for an air conditioner operation mode. The method includes: when a customized setting instruction for an air conditioner operation mode sent by a user is received, providing a customized setting interface of the operation mode for a user to set the air conditioner operation parameters in a customized manner, and mapping and relating operation parameters set in the customized manner to a virtual button, so that the differentiated presetting of the air conditioner operation parameters according to the difference of individual users is realized, and one-button operation is realized by mapping and relating the air conditioner operation parameters to the virtual button, thereby effectively increasing the convenience and accuracy of the (Continued)

operation of an air conditioner. Also disclosed is a customized control system for an air conditioner operation mode.

17 Claims, 19 Drawing Sheets

(51) Int. Cl.
    *F24F 11/30*     (2018.01)
    *G05B 15/02*     (2006.01)
    *G06F 3/0484*     (2013.01)
    *G06F 3/0488*     (2013.01)
    *F24F 11/65*     (2018.01)

(52) U.S. Cl.
    CPC ...... *G06F 3/04847* (2013.01); *G06F 3/04886* (2013.01); *F24F 11/52* (2018.01); *F24F 11/65* (2018.01)

(56) References Cited

U.S. PATENT DOCUMENTS

| | | | | |
|---|---|---|---|---|
| 2005/0149870 A1* | 7/2005 | Van Ee | ............ | H04B 1/205 715/700 |
| 2007/0038315 A1* | 2/2007 | Lin | ............ | G05B 19/0426 700/65 |
| 2010/0070089 A1* | 3/2010 | Harrod | ............ | G05B 19/042 700/277 |
| 2010/0138764 A1* | 6/2010 | Hatambeiki | ............ | G08C 17/02 715/765 |
| 2010/0268426 A1* | 10/2010 | Pathak | ............ | G06F 3/03547 701/48 |
| 2011/0015802 A1* | 1/2011 | Imes | ............ | G05D 23/1923 700/300 |
| 2011/0082615 A1* | 4/2011 | Small | ............ | B60K 35/00 701/36 |
| 2012/0151394 A1 | 6/2012 | Locke | | |
| 2013/0345882 A1 | 12/2013 | Dushane et al. | | |
| 2014/0031991 A1* | 1/2014 | Bergman | ............ | F24F 11/30 700/276 |
| 2014/0151456 A1* | 6/2014 | McCurnin | ............ | G05D 23/1905 236/51 |
| 2015/0127173 A1* | 5/2015 | Chinnaiyan | ............ | F24F 11/30 700/276 |
| 2015/0203062 A1* | 7/2015 | Gautama | ............ | B60R 16/037 701/49 |
| 2016/0139752 A1* | 5/2016 | Shim | ............ | G06F 3/0483 715/771 |

FOREIGN PATENT DOCUMENTS

| | | |
|---|---|---|
| CN | 102262818 A2 | 11/2011 |
| CN | 102767884 A | 11/2012 |
| CN | 103032935 A | 4/2013 |
| CN | 103604197 A | 2/2014 |
| EP | 2088754 A1 | 8/2009 |
| JP | 2010159922 A | 7/2010 |
| KR | 20120016752 A | 2/2012 |

OTHER PUBLICATIONS

International Search Report of PCT Patent Application No. PCT/CN2014/087411 dated Dec. 30, 2014.
The State Intellectual Property Office of PRC (SIPO) The First Office Action for CN Application No. 201410038900.5 dated Jan. 24, 2017 9 Pages (Translation Included).

* cited by examiner

CUSTOMIZED CONTROL METHOD AND SYSTEM FOR AIR CONDITIONER OPERATION MODE

FIELD OF THE INVENTION

The present invention relates to the field of air conditioner controlling technologies, and in particular, to a customized control method and system for air conditioner operation mode.

BACKGROUND OF THE INVENTION

Currently, with the rapid development of touch screen technologies, touch displays have already been applied in terminal devices such as mobile phones, tablet personal computers, on a large scale, and touch displays have also been applied in home appliances (such as, air conditioner) gradually. Middle-grade or high-grade air conditioner already has big touch screens, user can directly operate virtual keys or menus on the touch screen of the air conditioner to operate the air conditioner directly. With the rapid development of internet of things and radio frequency techniques, when users install control software of air conditioners in the terminal devices such as the mobile phones, users can also control the air conditioner through the virtual keys or menus on the touch screen of the mobile phone.

However, the operation mode of the air conditioner is normally designed by the factory, such as meeting mode, office mode, reading mode, and so on, the operation mode cannot be customized according to personal needs, such as whether a wind guiding angle faces the human body or avoid the human body, whether wind sweep, the size of wind sweeping range, how the temperature is set, the setting of the parameters of the sleeping curve, and so on. When a user uses the air conditioner, a plurality of operation parameters of the air conditioner should be commonly adjusted to satisfy the using needs, so that, when somebody else use the air conditioner, they should adjust the operation parameters again to satisfy the using needs of themselves, the operation is complicated, time-consuming and easy to get wrong.

SUMMARY OF THE INVENTION

The main aim of the present disclosure is that the operation parameters of the air conditioner are preset differently according to different users, and a key to operate the mapping relation between the operation parameters of the air conditioner and the virtual keys is realized, a convenience and an accuracy of the operation of the air conditioner are improved.

In order to realize the aim, the present disclosure provides a customized control method for an air conditioner operation mode, which includes: a control terminal or the air conditioner provides a customized setting interface for operation mode for a user to customize operation parameters of the air conditioner when the control terminal or the air conditioner receives a customized setting command for the air conditioner operation mode sent out by the user; the control terminal or the air conditioner generates and displays a virtual key according to a customized operational parameter when the user finishes the customized setting of the operation mode based on the customized setting interface of operation mode; when the control terminal receives a trigger command for the virtual key caused by user, the control terminal controls the air conditioner according to the operation parameters corresponding to the generated virtual key, or, when the air conditioner receives the trigger command for the virtual key caused by user, the air conditioner operates according to the operation parameters corresponding to the generated virtual key.

Preferably, the method further includes: when the control terminal or the air conditioner receives a customized modification command for air conditioner operation mode sent out by user corresponding to the existed virtual key, the control terminal or the air conditioner provides a customized modification interface for operation mode for user to customize operation parameters of the air conditioner corresponding to the existed virtual key Preferably, the method further includes: when the control terminal or the air conditioner receives a customized deleting command for the existed virtual key sent out by user, the control terminal or the air conditioner supports a customized deleting interface for operation mode for user to customized delete the existed virtual key and operation parameters corresponding to the existed virtual key.

Preferably, the method further includes: when the control terminal receives a trigger command from the virtual key caused by the user, the control terminal controls the operation of the air conditioner according to the operation parameters corresponding to the existed virtual key; or, when the air conditioner receives the trigger command from the virtual key caused by the user, the air conditioner operates according to the operation parameters corresponding to the existed virtual key.

In addition, in order to realize the aim, the present disclosure also provides a customized control method for an air conditioner operation mode, which includes: when a virtual key adding command sent by a user is received, the control terminal or the air conditioner generates and displays a virtual key, an operation parameter of the virtual key to be set customarily; when a customized setting command for the air conditioner operation mode sent out by the user and corresponding to the generated virtual key is received, the control terminal or the air conditioner provides a customized setting interface for operation mode for a user to customize operation parameters of the air conditioner; when the user finishes the customized of the operation parameters based on the customized setting interface for operation mode, the control terminal or the air conditioner sets up a mapping relation between the customized operation parameter and the generated virtual key; when a trigger command of the virtual key caused by user is received, the control terminal controls the air conditioner according to the operation parameters corresponding to the generated virtual key, or, when the air conditioner receives the trigger command of the virtual key caused by user, the air conditioner operates according to the operation parameters corresponding to the generated virtual key Preferably, the method further includes: when the control terminal or the air conditioner receives a customized modification command for air conditioner operation mode sent out by user corresponding to the existed virtual key, the control terminal or the air conditioner provides a customized modification interface for operation mode for user to customize operation parameters of the air conditioner corresponding to the existed virtual key.

Preferably, the method further includes: when the control terminal or the air conditioner receives a customized deleting command for the existed virtual key sent out by user, the control terminal or the air conditioner supports a customized deleting interface for operation mode for user to customized delete the existed virtual key and operation parameters corresponding to the existed virtual key.

Preferably, the method further includes: when the control terminal receives a trigger command from the virtual key caused by the user, the control terminal controls the operation of the air conditioner according to the operation parameters corresponding to the existed virtual key; or, when the air conditioner receives the trigger command from the virtual key caused by the user, the air conditioner operates according to the operation parameters corresponding to the existed virtual key.

In addition, in order to realize the aim, the present disclosure further provides a customized control system for an air conditioner operation mode, the customized control system for an air conditioner operation mode is run on a control terminal or the air conditioner, customized control system for an air conditioner operation mode includes:

a mode customized module, which is used for providing a customized setting interface for operation mode for a user to customize operation parameters of the air conditioner when a customized setting command for the air conditioner operation mode sent out by the user is received; and generating and displaying a virtual key according to the customized operational parameter when the user finishes the customized setting of the operation mode based on the customized setting interface of operation mode;

a customized mode excitation module, when the control terminal receives a trigger command from the virtual key caused by the user, the customized mode excitation module controls the operation of the air conditioner according to the operation parameters corresponding to the existed virtual key; or, when the air conditioner receives the trigger command from the virtual key caused by the user, the customized mode excitation module operates according to the operation parameters corresponding to the existed virtual key.

Preferably, the mode customized module is also used for that: when a customized modification command for air conditioner operation mode sent out by user corresponding to the existed virtual key is received, the mode customized module provides a customized modification interface for operation mode for user to customize operation parameters of the air conditioner corresponding to the existed virtual key.

Preferably, the mode customized module is also used for that: when a customized deleting command for the existed virtual key sent out by user is received, the mode customized module supports a customized deleting interface for operation mode for user to customized delete the existed virtual key and operation parameters corresponding to the existed virtual key.

Preferably, the customized mode excitation module is also used for that: when the control terminal receives a trigger command from the virtual key caused by the user, the customized mode excitation module controls the operation of the air conditioner according to the operation parameters corresponding to the existed virtual key; or, when the air conditioner receives the trigger command from the virtual key caused by the user, the customized mode excitation module operates according to the operation parameters corresponding to the existed virtual key.

In addition, in order to realize the aim, the present disclosure further a customized control system for an air conditioner operation mode, the customized control system for an air conditioner operation mode is run on a control terminal or the air conditioner, the customized control system for an air conditioner operation mode includes:

a mode customized module, which is used for that when a virtual key adding command sent by a user is received, the mode customized module generates and displays a virtual key, an operation parameter of the virtual key need to be set customarily; a customized setting command for the air conditioner operation mode sent out by the user and corresponding to the generated virtual key is received, the control terminal or the air conditioner provides a customized setting interface for operation mode for a user to customize operation parameters of the air conditioner; when the user finishes the customized of the operation parameters based on the customized setting interface for operation mode, the control terminal or the air conditioner sets up a mapping relation between the customized operation parameter and the generated virtual key;

a customized mode excitation module, which is used for that when a trigger command of the virtual key caused by user is received, the control terminal controls the air conditioner according to the operation parameters corresponding to the generated virtual key, or, when the air conditioner receives the trigger command of the virtual key caused by user, the air conditioner operates according to the operation parameters corresponding to the generated virtual key.

Preferably, the mode customized module is also used for that: when a customized modification command for air conditioner operation mode sent out by user corresponding to the existed virtual key is received, the mode customized module provides a customized modification interface for operation mode for user to customize operation parameters of the air conditioner corresponding to the existed virtual key.

Preferably, the mode customized module is also used for that: when a customized deleting command for the existed virtual key sent out by user is received, the mode customized module supports a customized deleting interface for operation mode for user to customized delete the existed virtual key and operation parameters corresponding to the existed virtual key.

Preferably, the customized mode excitation module is also used for that: when the control terminal receives a trigger command from the virtual key caused by the user, the customized mode excitation module controls the operation of the air conditioner according to the operation parameters corresponding to the existed virtual key; or, when the air conditioner receives the trigger command from the virtual key caused by the user, the customized mode excitation module operates according to the operation parameters corresponding to the existed virtual key.

Compared with the traditional technology, when the customized setting command for air conditioner operation mode is received, the present disclosure provides the customized setting interface for air conditioner operation mode for user to customize the operation parameters of the air conditioner, and maps the customized operation parameters with the virtual keys, so that the operation parameters of the air conditioner can be differently preset according to different users, and one key to operate can be realized by mapping the operation parameters of the air conditioner with the virtual keys, the convenience and the accuracy of the operation of the air conditioner are improved.

The realizing of the aim, functional characteristics, and advantages of the present disclosure are further described in detail with reference to the accompanying drawings and the embodiments.

DETAILED DESCRIPTION OF THE EMBODIMENTS

It is to be understood that, the described embodiments are only some exemplary embodiments of the present invention, and the present invention is not limited to such embodiments.

Figure 1:
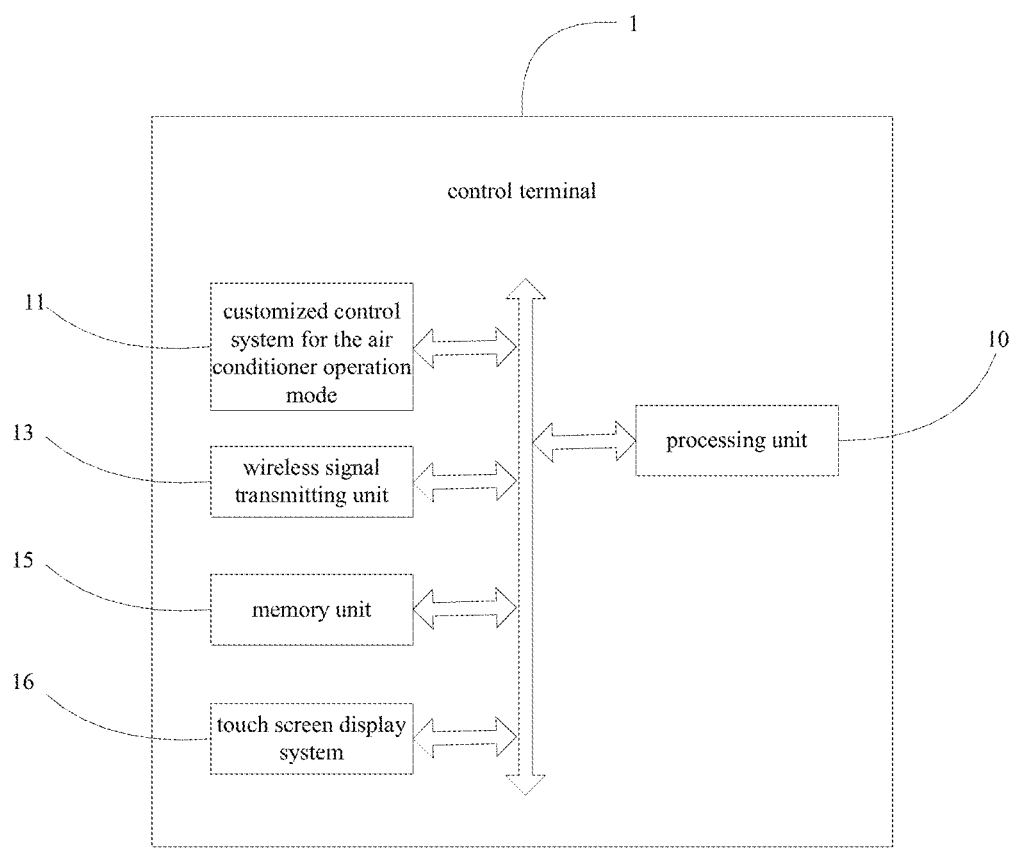
FIG. 1 is a hardware structure diagram of a control terminal realizing a customized control for an air conditioner operation mode according to a preferable embodiment.

As shown in FIG. 1, FIG. 1 is a hardware structure diagram of a control terminal realizing a customized control for an air conditioner operation mode according to a preferable embodiment. The control terminal 1 includes a processing unit 10, a memory unit 15, a wireless signal transmitting unit 13, a touch screen display system 16 and a customized control system for air conditioner operation mode 11. The control terminal 1 can be a mobile phone, a tablet personal computer, a computer or other any applicable electronic devices (preferably, the mobile phone).

The touch screen display system 16 can be used for providing a human-computer interface for user to input commands, and output and display response data for a user command caused by the control terminal 1. In the exemplary embodiment, the human-computer interface includes, but not limited to, a customized setting interface for air conditioner operation mode.

Figure 2:
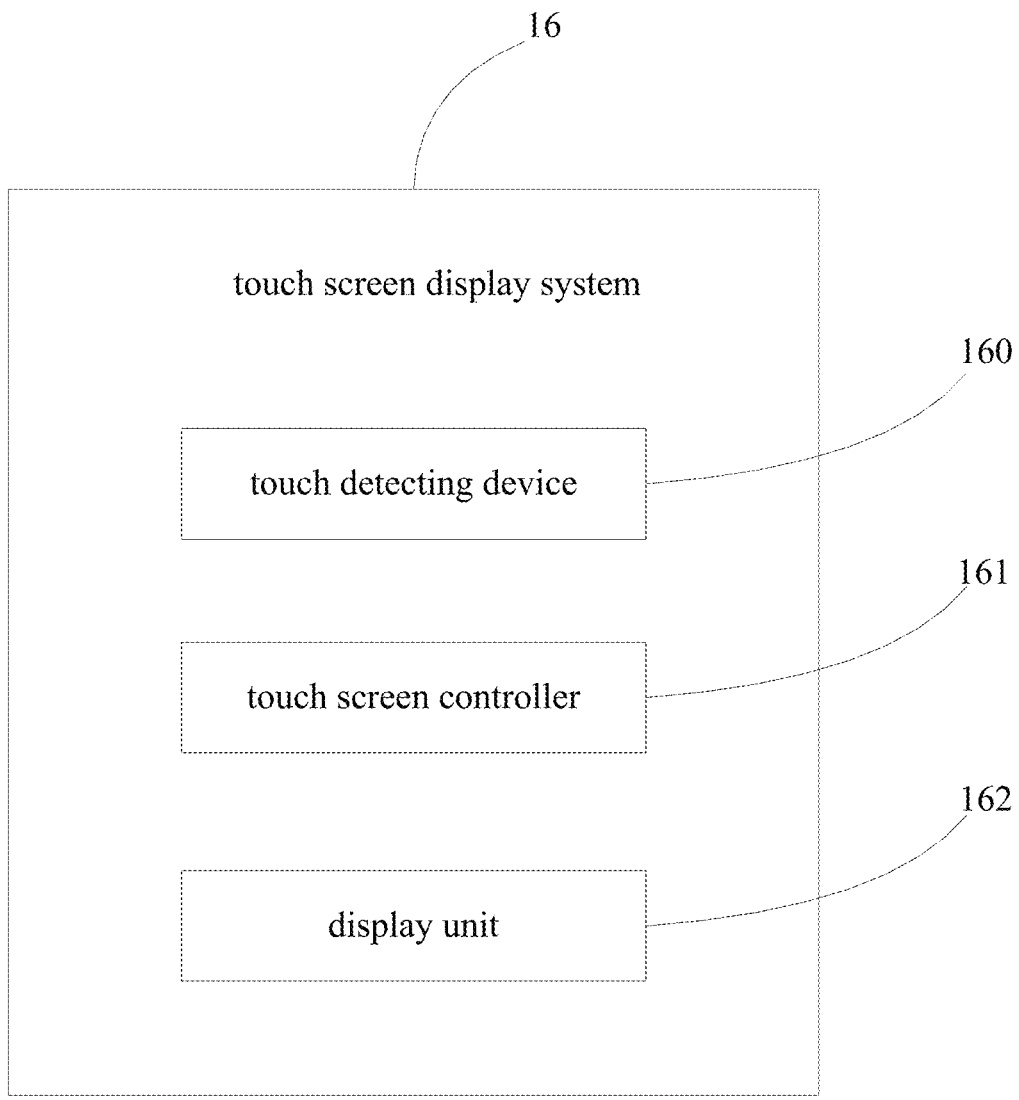
FIG. 2 is a system architecture diagram of the touch screen display system shown in FIG. 1.

As shown in FIG. 2, FIG. 2 is a system architecture diagram of the touch screen display system 16 shown in FIG. 1. The touch screen display system 16 includes a touch detecting device 160, a touch screen controller 161 and a display unit 162. The display unit 162 can be used for displaying information content; the touch detecting device 160 and the touch screen controller 161 can be used for user to proceed touch operation by the touch screen display system 16. Whereby, the touch detecting device 160 can be used for detecting a touch position of user and transfer the detected information to the touch screen controller 161; the touch screen controller 161 receives the touch position information from the touch detecting device 160, and converts the received touch position information into contact coordinate information, transfers the converted contact coordinate information to the processing unit 10, and receives executive commands sent from the processing unit 10 and executes.

In another exemplary embodiment of the present disclosure, the screen display system 16 can also be any other applicable display systems having the touch function.

The memory unit 15 can be used for storing the customized control system for air conditioner operation mode 11 and operation data of the customized control system for air conditioner operation mode 11. It is to be noted that, the memory unit 15 can be either a separated memory device, or a general term of a plurality of different memory devices, no need to repeat herein.

The wireless signal transmitting unit 13 can be used for sending out a control signal corresponding to the operating parameter of the user customized operation mode to the air conditioner 2 under the controlling of the processing unit 10, the wireless signal transmitting unit 13 can be a WIFI module, an infrared signal transmission unit, a Bluetooth module, a wireless signal emitter having a transmitting antenna or any other applicable wireless signal transmitting units (the present disclosure prefers the infrared signal transmission unit).

The processing unit 10 can be used for calling and executing the customized control system for air conditioner operation mode 11, so that, under the operation of user, the processing unit 10 provides customized setting interfaces of air conditioner operation mode (such as, the interfaces shown in FIGS. 4-14) for user to customize the operation parameters of the air conditioner, generates and displays a virtual key corresponding to the customized operation parameters, when a trigger command of the virtual key caused by the user is received (such as, a click command), the wireless signal transmitting unit 13 is controlled to send out a control signal to the conditioner according to the operation parameters corresponding to the virtual key, the operation control of the conditioner can be realized. The processing unit 10 and the memory unit 15 can be a separate unit respectively, or integrated with each other to form a controller, no need to repeat herein.

In the exemplary embodiment, the operation parameters include a temperature parameter, a humidity parameter, a blowing direction parameter, a sleeping temperature curve parameter and an operation time parameter. In another exemplary embodiment, the operation parameters include the temperature parameter, the humidity parameter, the blowing direction parameter, the sleeping temperature curve parameter, the operation time parameter and/or any other applicable operation parameters (such as a display luminosity curve of the air conditioner, a display color parameter of the air conditioner, and so on).

Figure 10:
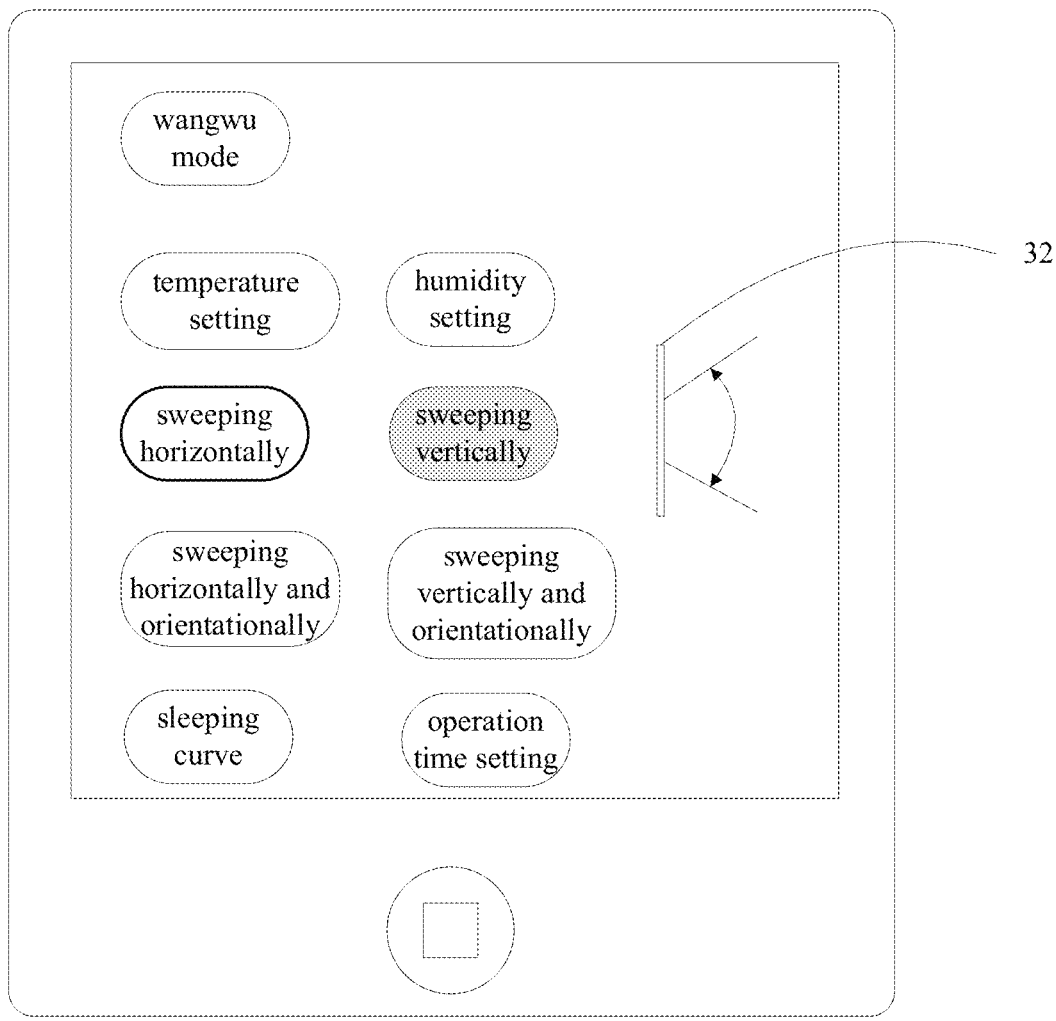
Figure 11:
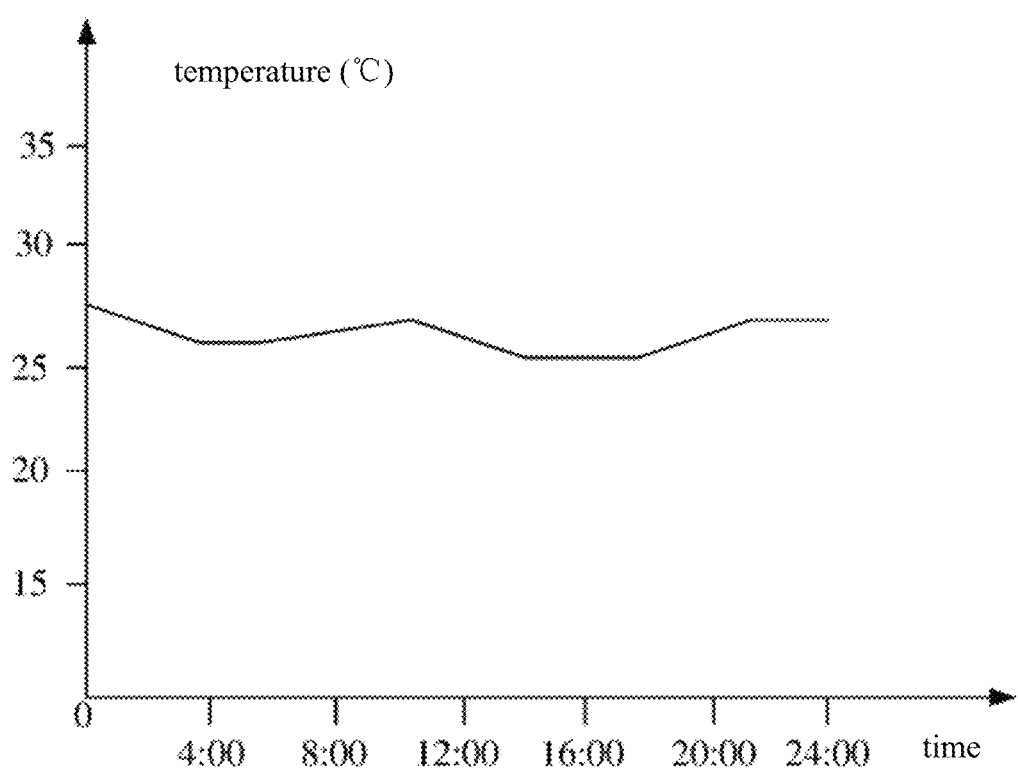
Figure 12:
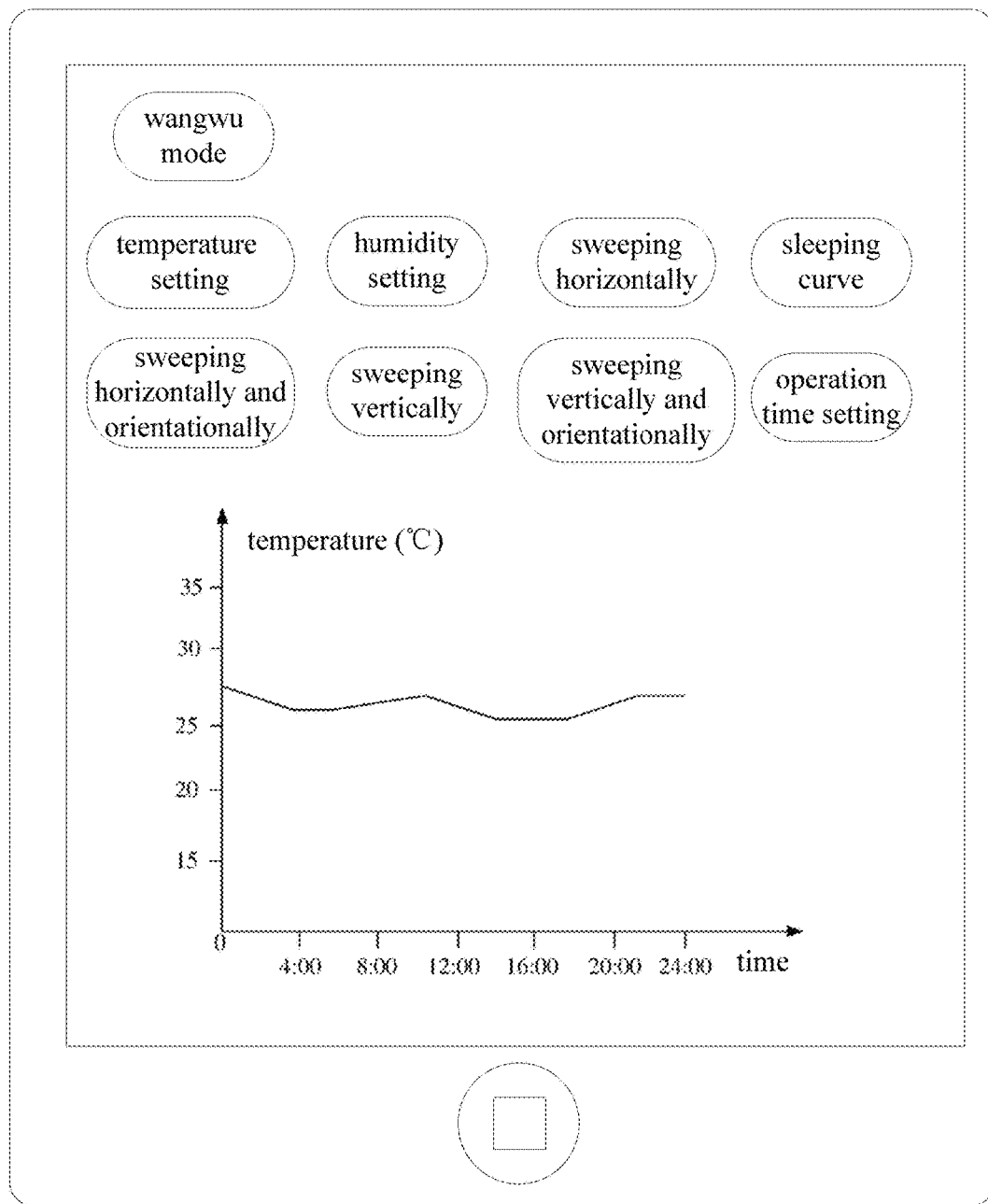

In the exemplary embodiment, the customized setting interface of the operation mode includes a control interface of the conditioner (such as, the interface shown in FIG. 4), operation interfaces of adding the virtual keys (such as, the interfaces shown in FIGS. 5-13), operation interfaces of modifying the virtual keys (such as, the interfaces shown in FIGS. 5-13), an operation interface of deleting the virtual keys (such as, the interface shown in FIG. 14), a setting/modification interface for selecting temperature parameter (such as, the interface shown in FIG. 6), a setting/modification interface for selecting humidity parameter (such as, the interface shown in FIG. 6), a setting/modification operation interface for selecting operation time (such as, the interface shown in FIG. 13), setting/modification interfaces for selecting blowing direction parameter (such as, the interfaces shown in FIGS. 7-10), setting/modification operation interfaces for selecting sleeping temperature curve parameter (such as, the interfaces shown in FIGS. 11-12). In another exemplary embodiment, the customized setting interfaces of the operation mode include any applicable setting interfaces, such as, when the control terminal 1 can control a plurality of conditioners, in a preferable exemplary embodiment, preferably include one interface which can be used for selecting a plurality of conditioners, no need to repeat herein.

That is, one of an ordinary skill in the art should knows that: the parameter types included in the operation parameters cannot limit inventive ideas of the present disclosure; the interface types and forms included in the customized setting interfaces of the operation mode cannot limit the inventive ideas of the present disclosure.

Figure 3:
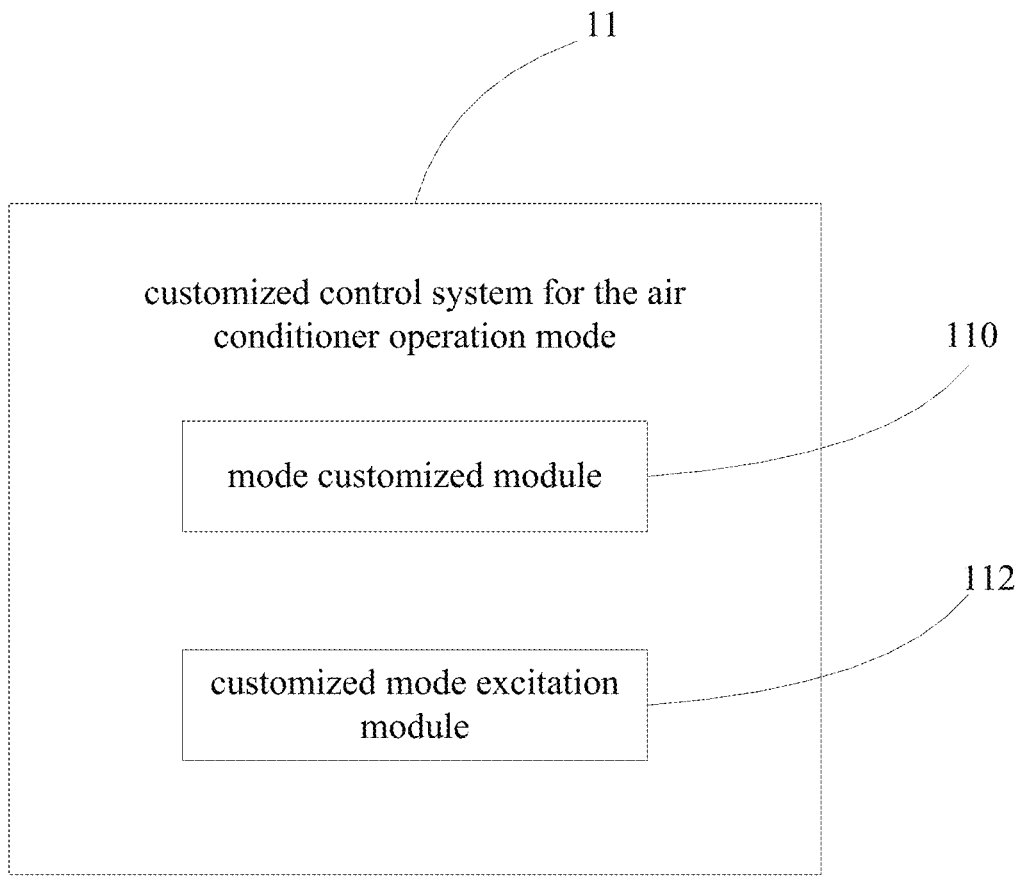
FIG. 3 is a functional block diagram of the customized control system for air conditioner operation mode shown in FIG. 1 according to a preferable exemplary embodiment.

As shown in FIG. 3, FIG. 3 is a functional block diagram of the customized control system for air conditioner operation mode according to a preferred exemplary embodiment.

It is to be noted that, for an ordinary skill in the art, the functional block diagram of FIG. 3 is just a sample diagram of a preferred exemplary embodiment, ordinary skills in the art around the functional blocks of the customized control system of air conditioner operation mode 11 shown in the FIG. 3 can add new functional blocks easily; the name of each functional block is a customized name, only used for understanding each application functional block of the customized control system of air conditioner operation mode 11, and cannot limit the technical solutions of the present disclosure, the core of the technical solutions of the present disclosure is that, the function which each function block having the custom name is aim to achieve.

The customized control system of air conditioner operation mode 11 includes a mode customized module 110 and a customized mode excitation module 112. The functions of each function module of the customized control system of air conditioner operation mode 11 can be:

Embodiment 1

The mode customized module 110 can be used for providing customized setting interface of operation mode for user to customize operation parameters of the air conditioner, when the mode customized module 110 receives a customized setting command for air conditioner operation mode sent by user. Embodiment 1, the mode customized module 110 provides customized adding icons/keys of operation mode, when user uses the icons/keys (such as, "+mode" virtual key in the virtual keys area of operation mode 30) to do a preset mode operation (such as, click or double clicks), which determines that user sends out a customized adding command for the air conditioner operation mode; embodiment 2, when the mode customized module 110 detects that user does a touch operation of a preset touch path, which determines that user sends out a customized setting command for air conditioner operation mode.

The mode customized module 110 can also be used for generating and displaying virtual keys according to the customized operational parameters, when user finishes customizing the operation mode based on the customized setting interface of operation mode.

It is to be understood that, in the first exemplary embodiment, the mode customized module 110 not only supports the above virtual keys adding function, but also supports a modification function for parameters corresponding to the existed virtual keys, and a deleting function for the existed virtual keys.

Figure 4:
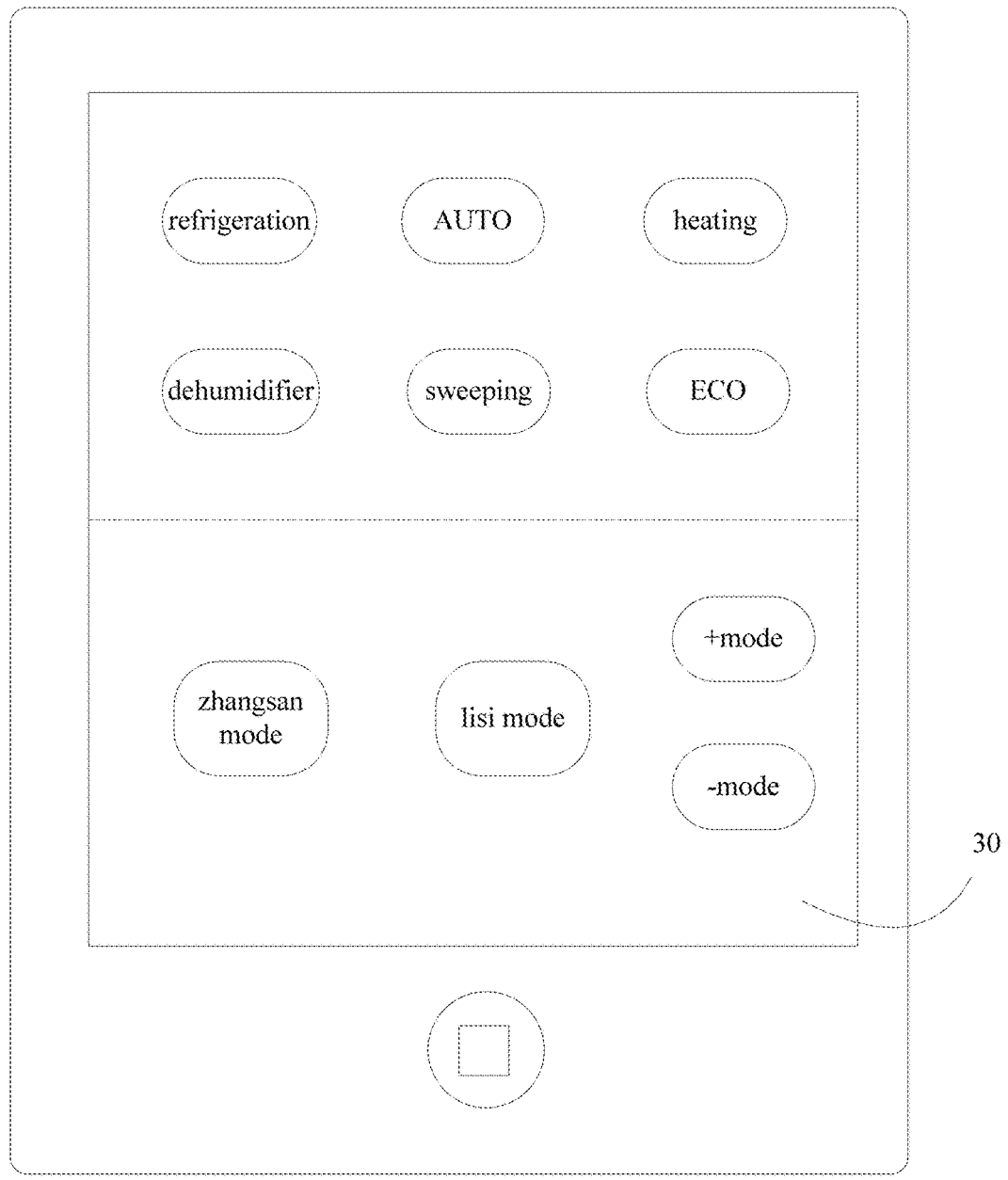
FIGS. 4-14 are customized setting interfaces provided by the customized control system for air conditioner operation mode shown in FIG. 1.
Figure 5:
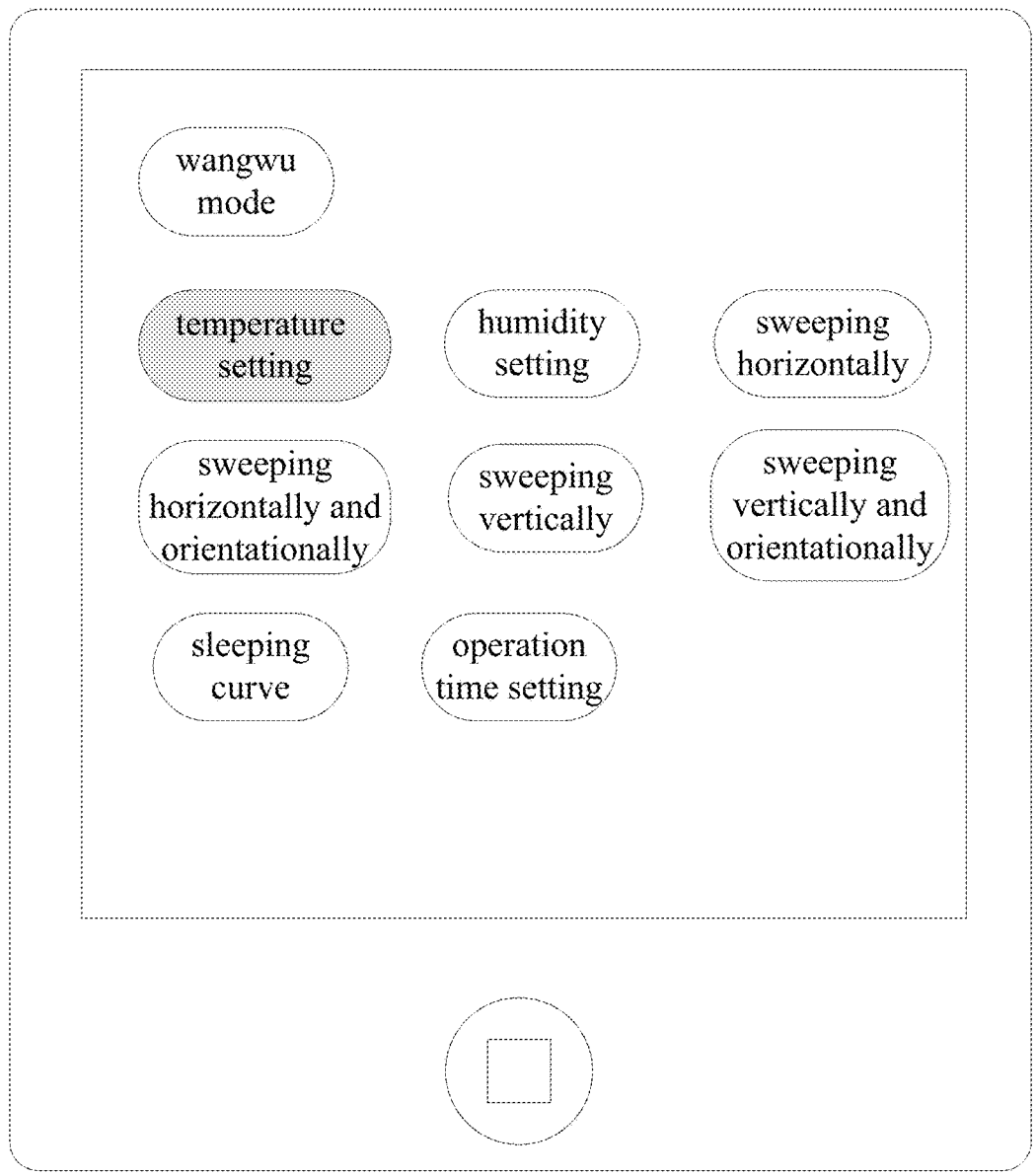
Figure 6:
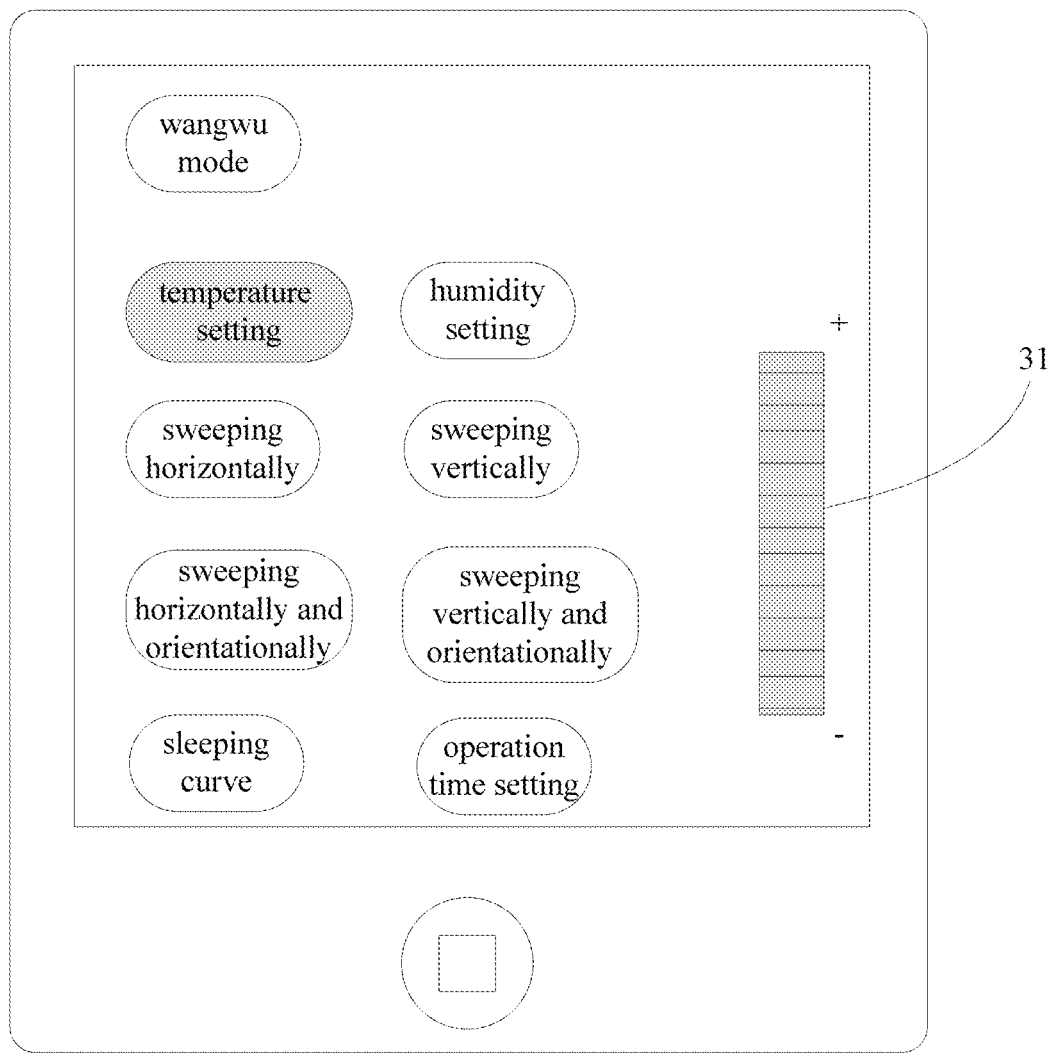
Figure 7:
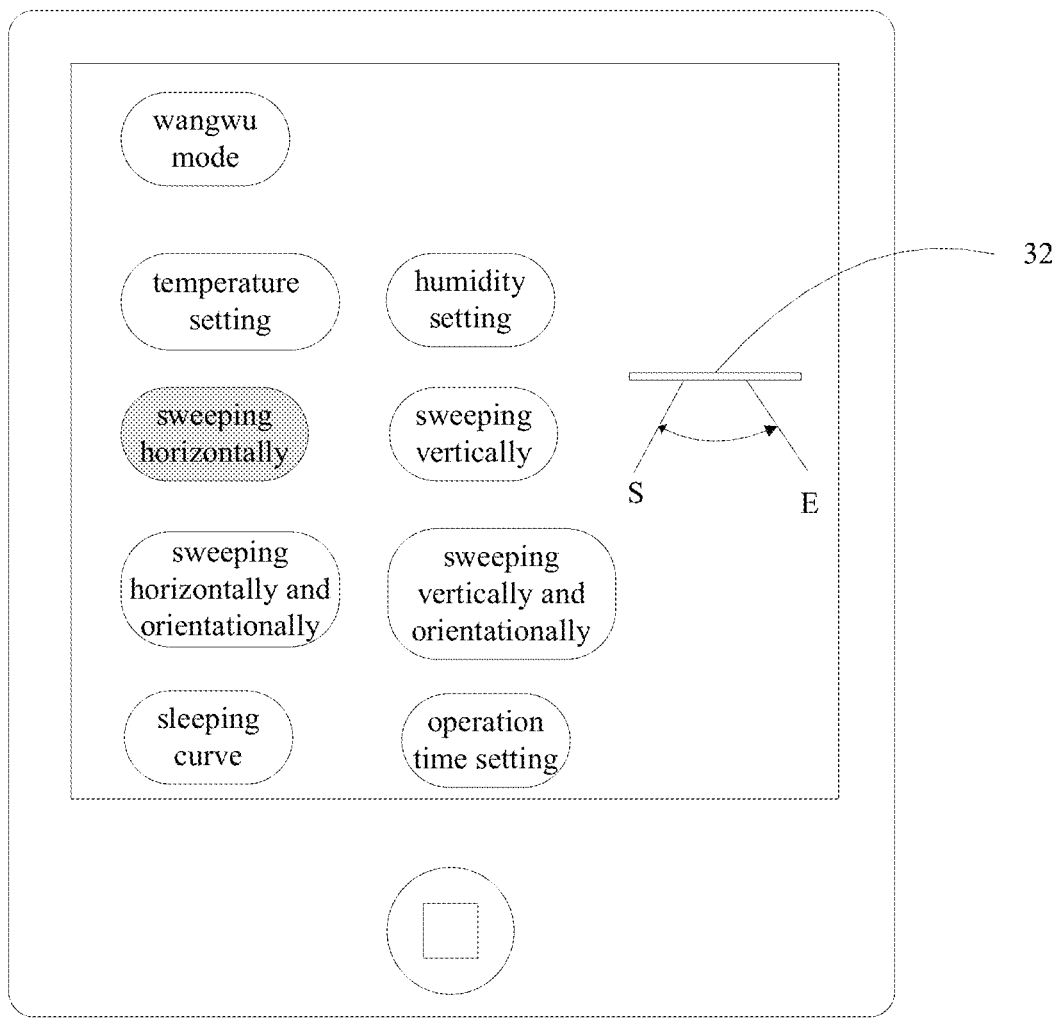
Figure 8:
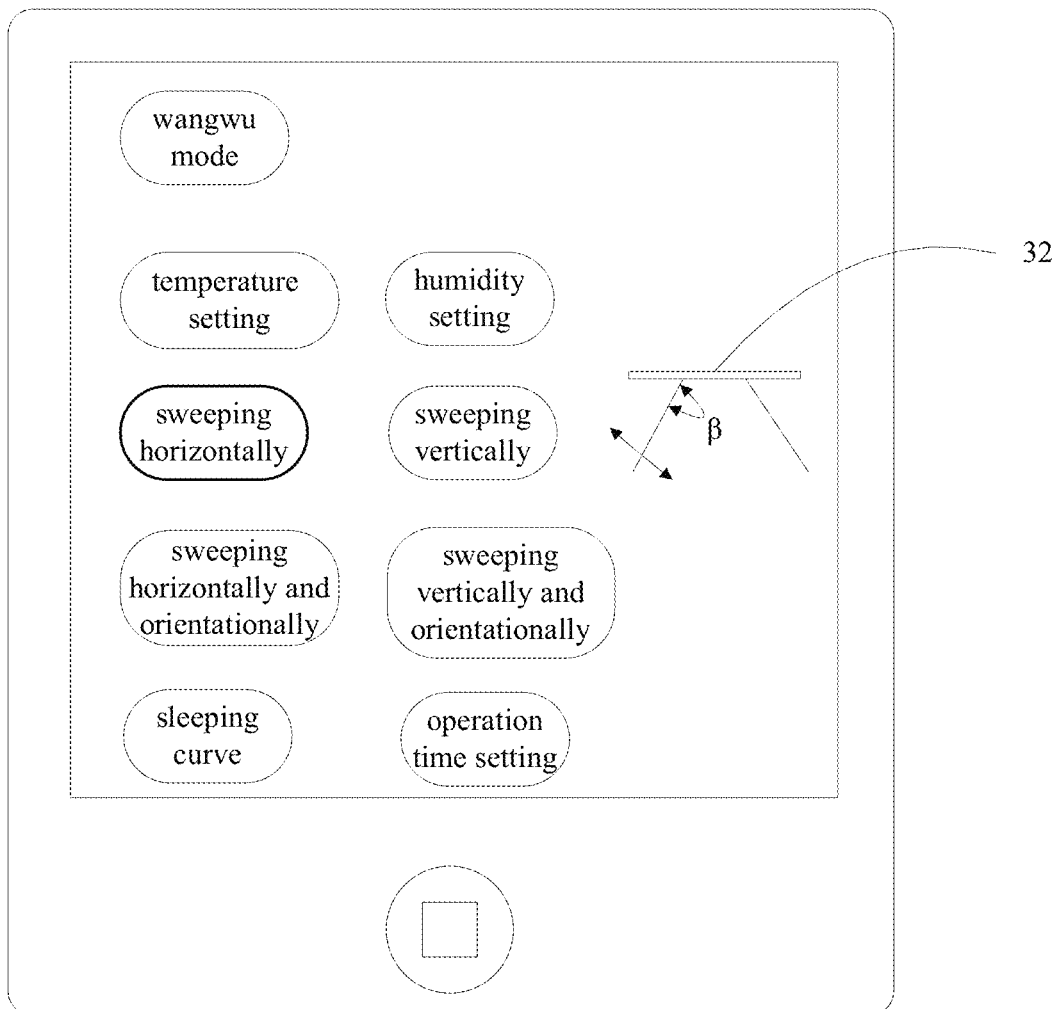
Figure 9:
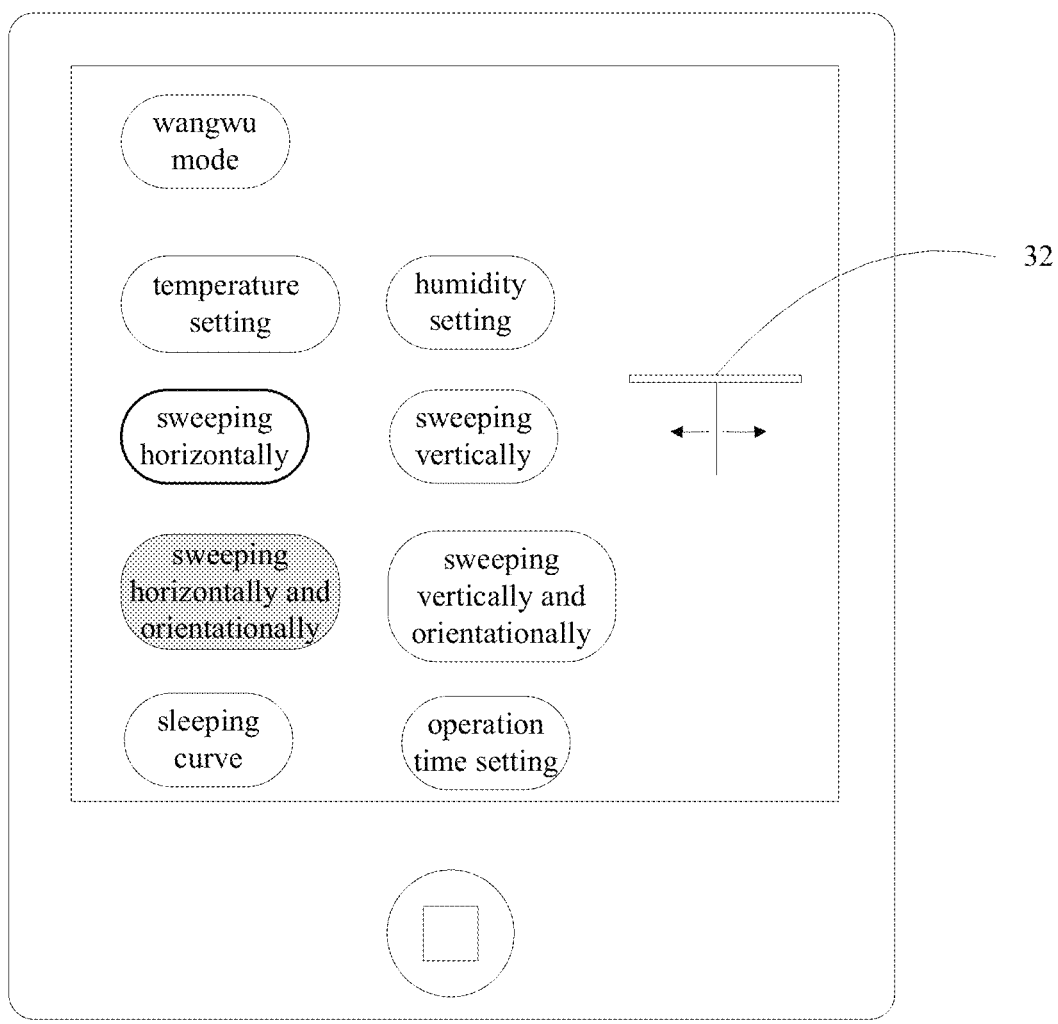
Figure 13:
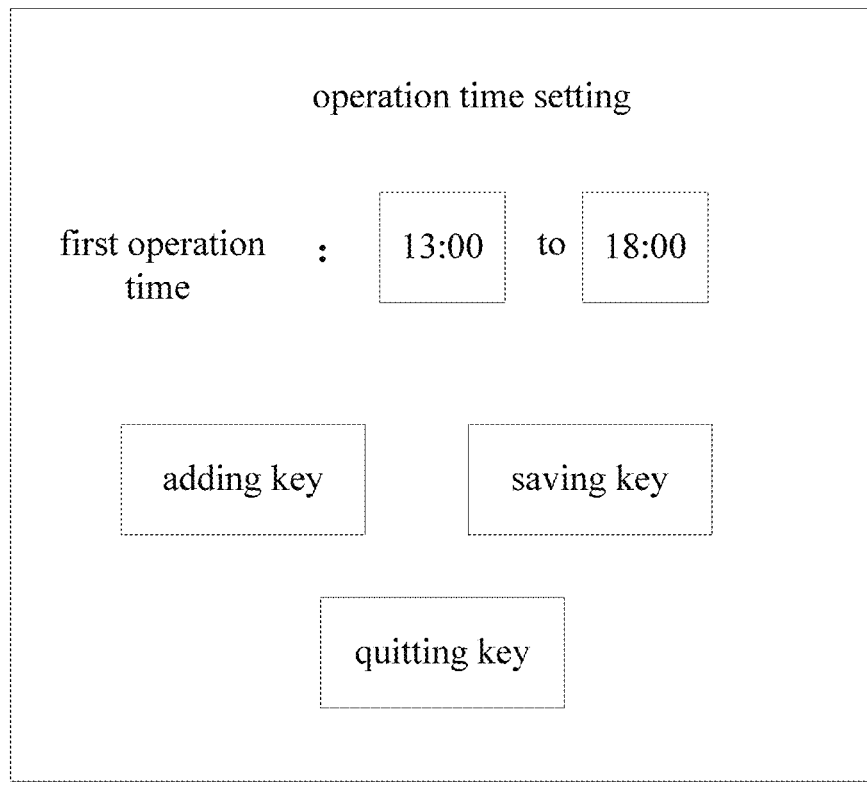

When the customized adding command of air conditioner operation mode sent out by user is received (such as, a command sent by clicking "+mode" virtual key in the virtual keys area of operation mode shown in FIG. 4 is received), the mode customized module 110 provides an interface as shown in FIG. 5 first (based on the interface, user can sets names of virtual cases corresponding to the operation mode needed to be customized, such as "wangwu mode" as shown in FIG. 5); when user selects and clicks a "temperature setting" key or a "humidity setting" key based on the interface shown in FIG. 5, the mode customized module 110 provides an interface shown as FIG. 6; when user selects and clicks a "sweeping horizontally" key based on the interface shown in FIG. 5, the mode customized module 110 provides interfaces shown as FIGS. 7-8; when user selects and clicks a "sweeping horizontally and orientationally" key based on the interface shown in FIG. 5, the mode customized module 110 provides an interface shown as FIG. 9; when user selects and clicks a "sweeping vertically" key based on the interface shown in FIG. 5, the mode customized module 110 provides an interface shown as FIG. 10; when user selects and clicks a "sleeping curve" key based on the interface shown in FIG. 5, the mode customized module 110 provides an interface shown as FIG. 11 or FIG. 12 (if the interface shown as FIG. 11 is provided, a new interface for setting temperature curve pops up; if the interface shown as FIG. 12 is provided, the original interface displays the interface for setting temperature curve); when user selects and clicks an "operation time setting" key based on the interface shown in FIG. 5, the mode customized module 110 provides interfaces shown as FIG. 13.

The interface shown in FIG. 6 includes a movably touch-bar 31, temperature/humidity setting value can be adjusted through moving and touching the movably touch-bar 31, such as, moving toward "+" symbol can gradually add the temperature/humidity setting value according to a preset magnitude, moving toward "−" symbol can gradually reduce the temperature/humidity setting value according to a preset magnitude.

The interface shown in FIG. 7 includes a sweeping control identifier 32, a sweeping horizontally area can be adjusted through moving and touching a threshold value control line S and/or E of the sweeping control identifier 32 (that is, a preset sweeping area can be defined as a area between the control line S and the control line E). When user moves and touches the control line of the sweeping control identifier 32, a sweeping angle β of the threshold value control line can be dynamically displayed (such as, shown as FIG. 8).

The interface shown in FIG. 9 includes the sweeping control identifier 32, a direction of the sweeping horizontally and orientationally can be adjusted by sliding a horizontal directional control line of the sweeping control identifier 32.

The interface shown in FIG. 10 is similar with the interface shown in FIG. 7, an operation mode of the interface shown in FIG. 10 is similar with an operation mode of the interface shown in FIG. 7, no needed to repeat herein.

In the interface shown in FIG. 11 or FIG. 12, curve parameters can be changed by moving and touching curves in a temperature-time coordinate.

Furthermore, in the interface shown in FIGS. 5-10, a "parameter adding key" (not shown) can be provided, a new parameter setting key can be added in the interface through clicking the "parameter adding key", a parameter type of the added new parameter setting key can be the same with parameter types of the existed parameter setting keys, the parameter type of the added new parameter setting key can be different from the parameter types of the existed parameter setting keys, no need to repeat herein.

When user uses the existed icons/keys (such as, the existed virtual key "zhangsan mode" or "lisi mode" in the virtual keys area of operation mode 30 shown in FIG. 4) to do an operation of preset type (such as, click or double-clicks), the mode customized module 100 determines that user sends out a customized modification command of air conditioner operation mode; or, when the mode customized module 100 detects that user does the touching operation of preset touch path, the mode customized module 100 determines that user sends out the customized modification command of air conditioner operation mode. It is to be understood that, the customized modification interface of the existed virtual keys can be similar or same with the above customized adding interface, no need to repeat herein.

Figure 14:
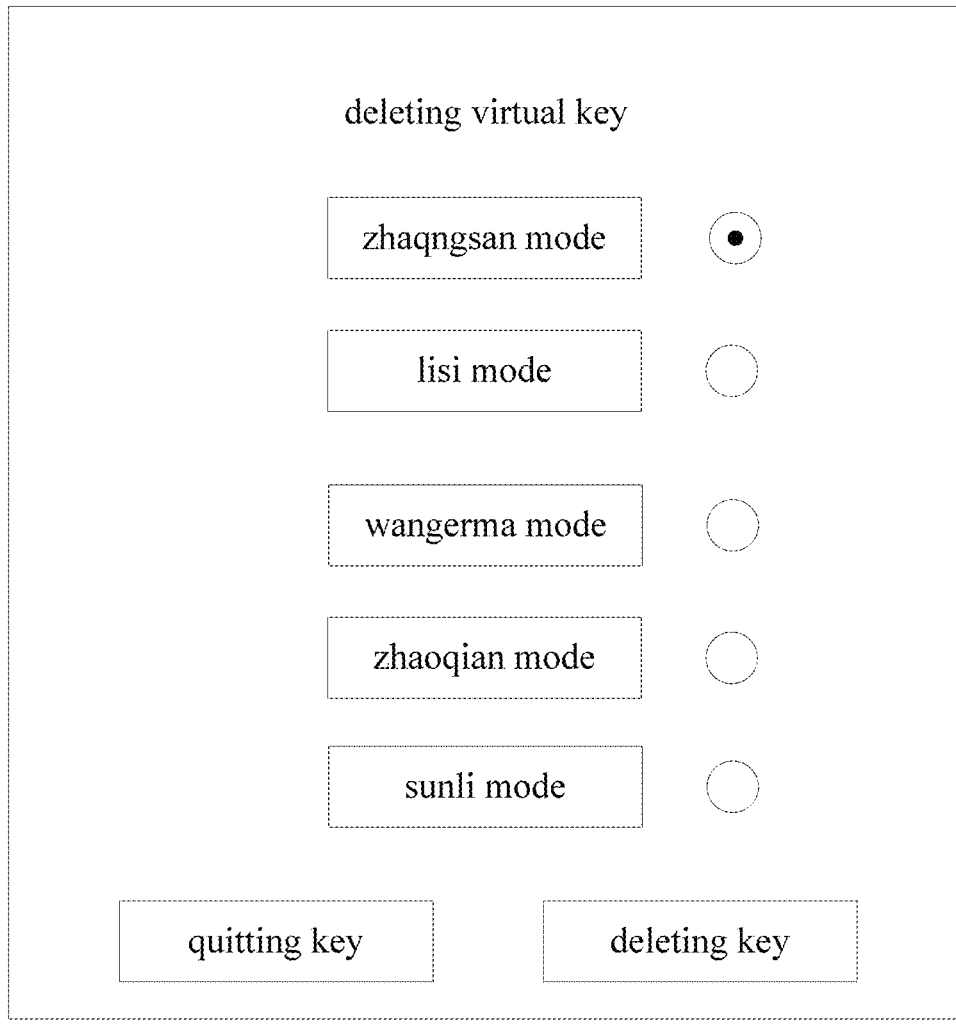

When the customized deleting command of air conditioner operation (such as, a command sent out by clicking "–mode" virtual key in the virtual keys area of operation mode 30 shown in FIG. 4) sent out by user is received, the mode customized module 100 provides the interface shown in FIG. 14 first, user can select to delete the existed operation mode (such as, "zhangsan mode", "lisi mode", "wangerma mode", "zhangqian mode" and/or "sunli mode") based on the interface shown in FIG. 14, "zhangsan mode" is selected in FIG. 14 as a example, when user clicks a "deleting key", the existed "zhangsan mode" virtual key and operation parameters corresponding to the "zhangsan mode" virtual key are deleted.

It is to be understood that, the mode customized module 100 can also determine process types needed to be handled through another methods (such as, adding virtual key, modifying virtual key, deleting virtual key), and provides corresponding operation interfaces based on the determined process types. Such as, a mapping relation between the process types and the operation types can be preset (such as, "adding virtual key" corresponds to clicking the icon, "modifying virtual key" corresponds to double clicking the icon, "deleting virtual key" corresponds to long pressing the icon (such as, pressing the icon more than three seconds)), when user does the operation type (such as, click, double-click, long press) to a specific icon, the mode customized module 110 determines that user sends out a corresponding process type; or, a mapping relation between the process types and the preset touch path is preset, when detects that user does the touch operation of the preset touch path, the mode customized module 110 determines that user sends out the corresponding process types.

The customized mode excitation module 112 is used for controlling the air conditioner according to the operation parameters corresponding to the virtual key when the customized mode excitation module 112 receives a trigger command of the virtual key caused by user (such as, a virtual key named "zhangsan mode").

Embodiment 2

The mode customized module 110 can be used for generating and displaying the virtual key that its operation parameter needs to be customized (such as, the virtual key is generated, default-generated name of the virtual key and icon of the virtual key can be a preset name and key icon respectively, or a name modifying command from user can be responded to modify the default-generated name and key icon, such as, the name is modified to "wangwu mode") when receives the adding command of the virtual key sent out by user, when the customized setting command for air conditioner operation mode corresponding to the virtual key sent by user is received (such as the virtual key named "wangwu mode), customized setting interface is provided for user to customize operation parameters of air conditioner. Embodiment 1, the mode customized module 110 provides customized adding icon/key of operation mode, when user does an operation of preset type (such as, click or double-clicks) to the icon/key (such as, the "+mode" virtual key in the virtual keys area of operation mode 30), the mode customized module 110 determines that user sends out the customized adding command for air conditioner operation mode; embodiment 2, when the mode customized module 110 detects that user does the touch operation of the preset touch path, the mode customized module 110 determines that user sends out the customized setting command for air conditioner operation mode.

The mode customized module 110 can also be used for setting up the mapping relation between the customized operation parameter and the virtual key when the customized setting of the operation mode is finished by user based on customized setting interface of the operation mode.

The customized mode excitation module 112 can be used for controlling the operation of the air conditioner according to the operation parameters corresponding to the virtual key when the trigger command of the virtual key (such as the virtual key named "wangwu mode") caused by the user is received.

It is to be understood that, in the second exemplary embodiment, the mode customized module 110 not only supports the adding function of virtual key, but also supports the modification function of modifying the parameters corresponding to the existed virtual key, and the deleting function of deleting the existed virtual key. Such as, when the mode customized module 120 receives the customized adding command for the air conditioner operation mode corresponding to the existed virtual key (such as virtual key named "lisi mode") sent out by user, the mode customized module 110 provides a customized modifying interface of the operation mode (such as, interfaces shown in FIGS. 5-13) for user to customize operation parameters of the air conditioner; when the mode customized module 110 receives the deleting command of the existed virtual keys sent out by user, the mode customized module 110 provides a customized deleting interface of the operation mode (such as, the interface shown in FIG. 14) for user to delete the existed virtual keys and corresponding operation parameters (such as, the virtual key named "lisi mode" and corresponding operation parameter).

It is to be understood that, in the second exemplary embodiment, the mode customized module 110 can determine process types needed to be handled through specific methods (such as, adding virtual key, modifying virtual key, deleting virtual key), and provides corresponding operation interfaces based on the determined process types. Such as, the mapping relation between the process types and the operation types can be preset (such as, "adding virtual key" corresponds to a click on the customized setting icon of the operation mode, "modifying virtual key" corresponds to double click on added or existed virtual key icon, "deleting virtual key" corresponds to long press on added or existed virtual key icon (such as, a continuous click operation more than three seconds)), when user does the operation type (such as, click) to a specific icon (such as, a customized setting icon of the operation mode), the mode customized module 110 determines that user sends out a corresponding process type command (such as, the command of adding virtual key; or, the mapping relation between the process types and the preset touch path is preset, when detects that user does the touch operation of the preset touch path, the mode customized module 110 determines that user sends out the corresponding process types.

Figure 15:
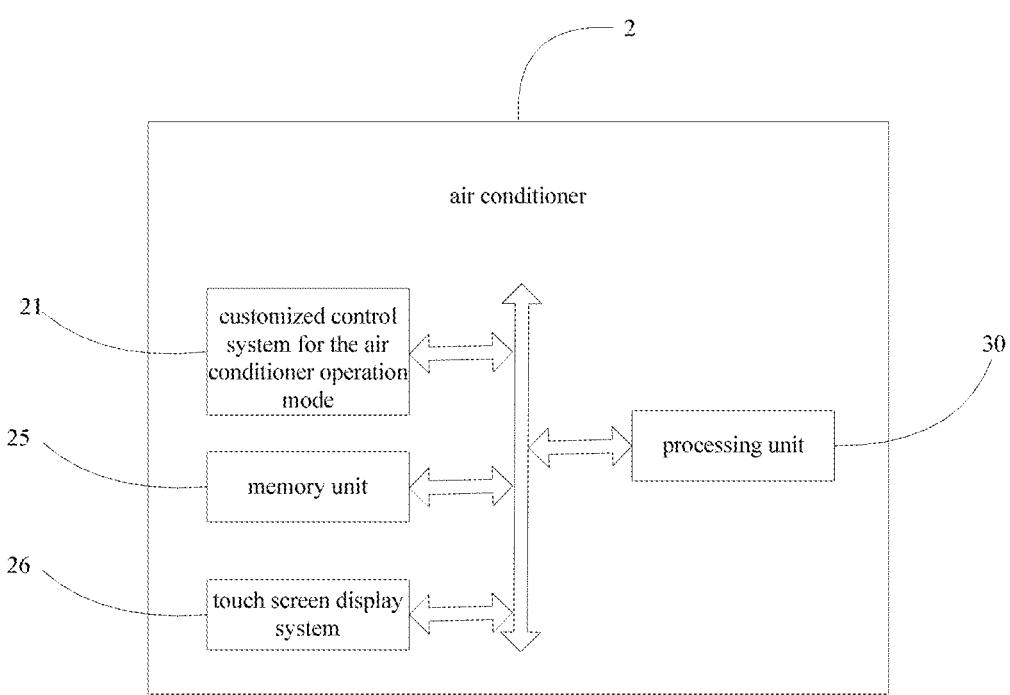
FIG. 15 is a hardware structure diagram of the air conditioner realizing the customized control for air conditioner operation mode according to a preferable exemplary embodiment of the present disclosure.

Referring to FIG. 15, FIG. 15 is a hardware structure diagram of the air conditioner realizing the customized control for air conditioner operation mode according to a preferable exemplary embodiment of the present disclosure. The air conditioner 2 includes a processing unit 20, a memory unit 25, a touch screen display system 26 and a customized control system of air conditioner operation mode 21.

The touch screen display system 26 can be used for providing the human-computer interaction interface for user to input a command, and to output and display response data from the air conditioner for user command. In the exemplary embodiment, the human-computer interaction interface includes, but not limited to, a customized setting interface of operation mode.

Figure 16:
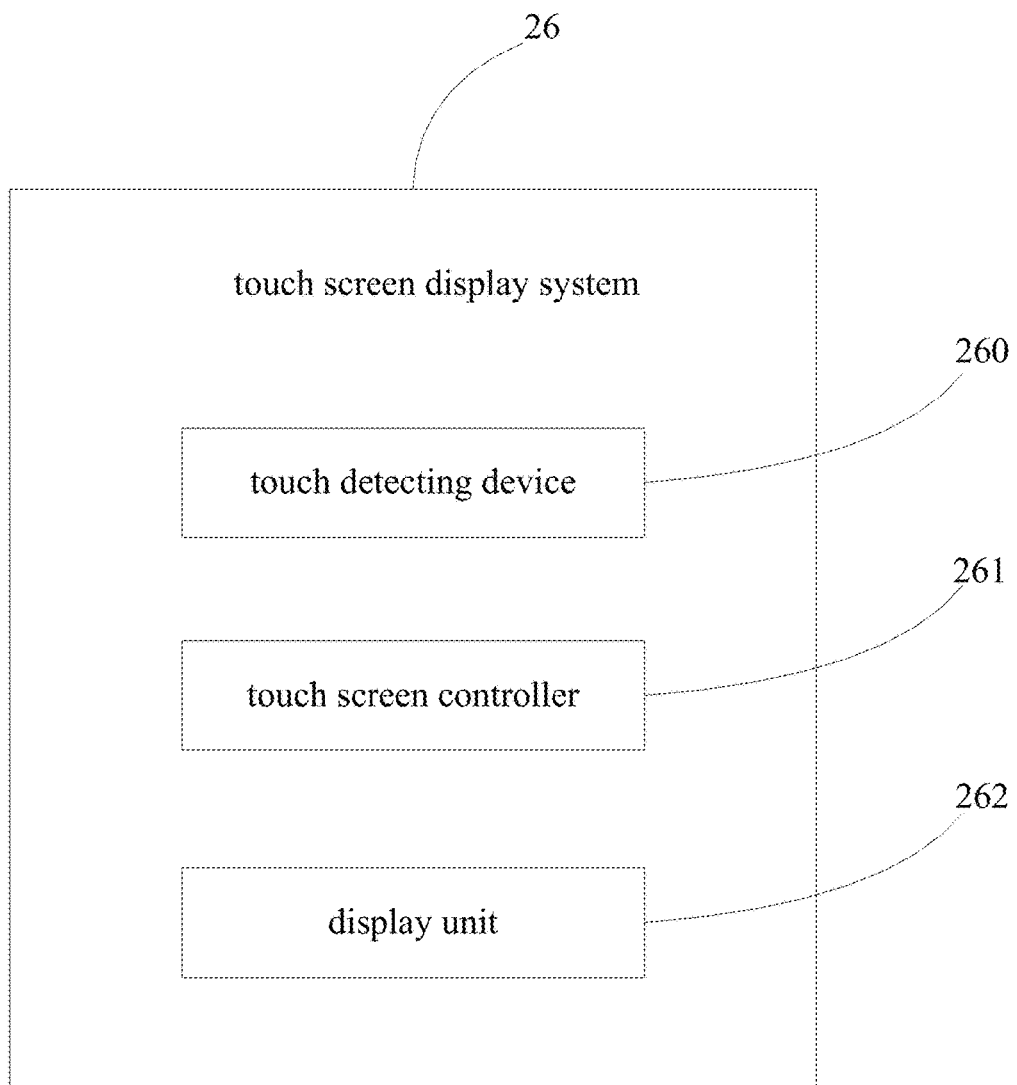
FIG. 16 is a system frame diagram of the touch screen display system shown in FIG. 15.

As shown in FIG. 16, FIG. 16 is a system frame diagram of the touch screen display system 26 shown in FIG. 15. The touch screen display system 26 includes a touch detecting device 260, a touch screen controller 261 and a display unit 262. The display unit 262 can be used for displaying information content; the touch detecting device 260 and the touch screen controller 261 can be used for user to proceed touch operation by the touch screen display system 26. Whereby, the touch detecting device 260 can be used for detecting a touch position of user and transfer the detected information to the touch screen controller 261; the touch screen controller 261 receives the touch position information sent by the touch detecting device 260, and converts the received touch position information into contact coordinate information, transfers the converted contact coordinate information to the processing unit 20, and receives an executive command sent from the processing unit 20 and executes.

In another exemplary embodiment of the present disclosure, the screen display system 26 can also be any other applicable display system having the touch function.

The memory unit 25 can be used for storing the customized control system for air conditioner operation mode 21 and the operation data of the customized control system for air conditioner operation mode 21. It is to be noted that, the memory unit 25 can be either a separated memory device, or a general term of a plurality of different memory devices, no need to repeat herein.

The processing unit 10 can be used for calling and executing the customized control system for air conditioner operation mode 21, so that, under the operation of user, the processing unit 20 can provide customized setting interfaces for the operation mode (such as, the interfaces shown in FIGS. 4-14) for user to customize the operation parameters of the air conditioner, generate and display a virtual key corresponding to the customized operation parameters, when a trigger command for the virtual key caused by user is received (such as, a click command), the processing unit 20 can operate according to the operation parameters corresponding to the virtual key. The processing unit 20 and the memory unit 25 can be a separate unit respectively, or integrated with each other to form a controller, no need to repeat herein.

In an exemplary embodiment, the operation parameters include a temperature parameter, a humidity parameter, a blowing direction parameter, a sleeping temperature curve parameter and an operation time parameter. In another exemplary embodiment, the operation parameters include the temperature parameter, the humidity parameter, the blowing direction parameter, the sleeping temperature curve parameter, the operation time parameter and/or any other applicable operation parameters (such as a display luminosity curve of the air conditioner, a display color parameter of the air conditioner, and so on).

In the exemplary embodiment, the customized setting interface of the operation mode includes a control interface of the conditioner (such as, the interface shown in FIG. 4), operation interfaces for adding the virtual keys (such as, the interfaces shown in FIGS. 5-13), operation interfaces for modifying the virtual keys (such as, the interfaces shown in FIGS. 5-13), an operation interface for deleting the virtual keys (such as, the interface shown in FIG. 14), a setting/modification interface for selected temperature parameter (such as, the interface shown in FIG. 6), a setting/modification interface for selected humidity parameter (such as, the interface shown in FIG. 6), a setting/modification interface for selecting operation time (such as, the interface shown in FIG. 13), setting/modification interfaces for selecting blowing direction parameter (such as, the interfaces shown in FIGS. 7-10), setting/modification operation interfaces for selecting sleeping temperature curve parameter (such as, the interfaces shown in FIGS. 11-12). In another exemplary embodiment, the customized setting interfaces of the operation mode include any applicable setting interfaces.

That is, one of an ordinary skill in the art should knows that: the parameter types included in the operation parameters cannot limit inventive ideas of the present disclosure; the interface types and forms included in the customized setting interfaces of the operation mode cannot limit the inventive ideas of the present disclosure.

Figure 17:
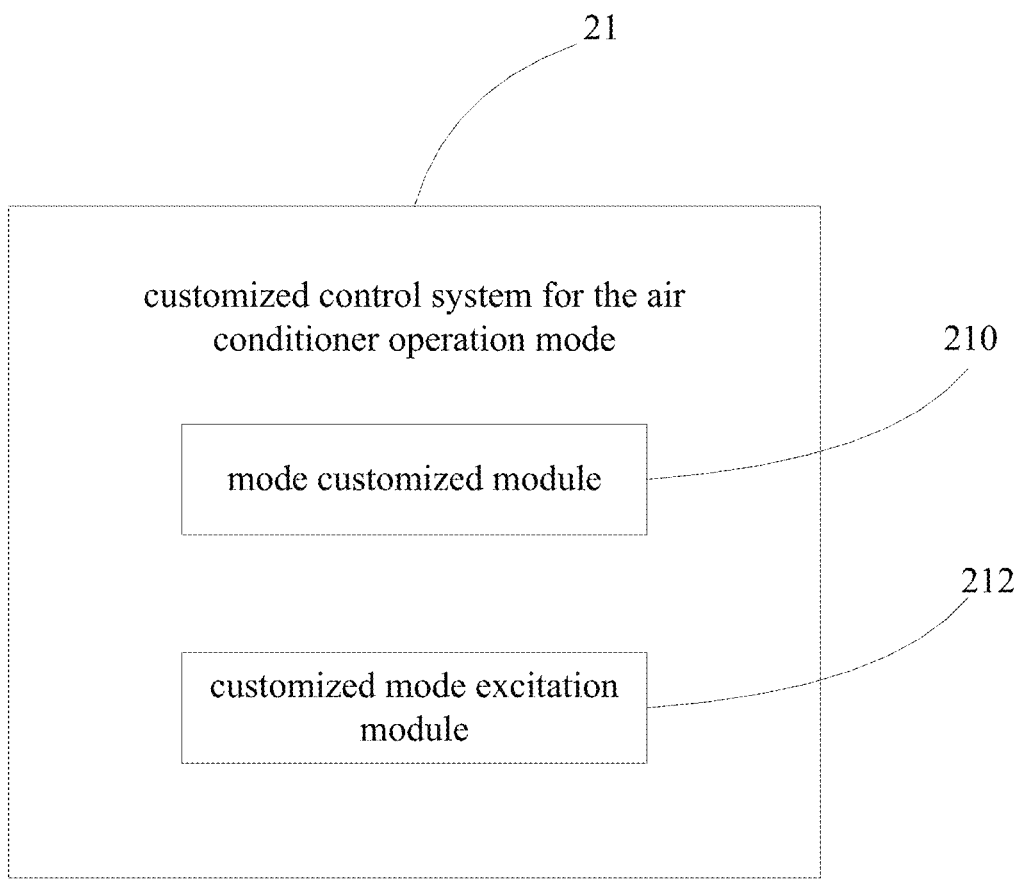
FIG. 17 is a functional block diagram of the customized control system for air conditioner operation mode shown in FIG. 15 according to a preferable exemplary embodiment.

As shown in FIG. 17, FIG. 17 is a functional block diagram of the customized control system for air conditioner operation mode shown in FIG. 12 according to a preferred exemplary embodiment.

It is to be noted that, for an ordinary skill in the art, the functional block diagram shown in FIG. 17 is just a sample diagram of a preferred exemplary embodiment, ordinary skills in the art around the functional blocks of the customized control system of the air conditioner operation mode 21 shown in the FIG. 17 can add new functional blocks easily; a name of each functional block is a customized name, only used for understanding each application functional block of the customized control system of the air conditioner operation mode 11, and cannot limit the technical solutions of the present disclosure, the core of the technical solutions of the present disclosure is that, the function which each function block having the custom name is aim to achieve.

The customized control system of air conditioner operation mode 21 includes a mode customized module 210 and a customized mode excitation module 212. The functions of each function module of the customized control system of the air conditioner operation mode 21 can be:

Embodiment 1

The mode customized module 210 can be used for providing customized setting interface of operation mode for user to customize operation parameters of the air conditioner when the mode customized module 210 receives customized setting command for air conditioner operation mode sent by user. Embodiment 1, the mode customized module 210 provides customized add icons/keys of operation mode, when user uses the icons/keys (such as, "+mode" virtual key in the virtual keys area of operation mode 30) to do a preset mode operation (such as, click or double clicks), which determines that user sends out a customized adding command for the air conditioner operation mode; embodiment 2, when the mode customized module 210 detects that user does a touch operation of a preset touch path, which determines that user sends out a customized setting command for air conditioner operation mode.

The mode customized module 210 can also be used for generating and displaying virtual keys according to the customized operational parameters, when user finishes the customized setting of the operation mode based on the customized setting interface of operation mode.

It is to be understood that, in the first exemplary embodiment, the mode customized module 210 not only supports the above virtual keys adding function, but also supports a modification function for parameters corresponding to the existed virtual keys, and a deleting function for the existed virtual keys. The following will describe the functions of the mode customized module 210 based on FIGS. 4-14:

When the customized adding command for the air conditioner operation mode sent out by user is received (such as, a command sent through clicking "+mode" virtual key in the virtual keys area of operation mode shown in FIG. 4 is received), the mode customized module 110 provides an interface as shown in FIG. 5 first (based on the interface, user can sets names of virtual cases corresponding to the operation mode needed to be customized, such as "wangwu mode" as shown in FIG. 5); when user selects and clicks a "temperature setting" key or a "humidity setting" key based on the interface shown in FIG. 5, the mode customized module 210 provides an interface shown as FIG. 6; when user selects and clicks a "sweeping horizontally" key based on the interface shown in FIG. 5, the mode customized module 210 provides interfaces shown as FIGS. 7-8; when user selects and clicks a "sweeping horizontally and orientationally" key based on the interface shown in FIG. 5, the mode customized module 210 provides an interface shown as FIG. 9; when user selects and clicks a "sweeping vertically" key based on the interface shown in FIG. 5, the mode customized module 210 provides an interface shown as FIG. 10; when user selects and clicks a "sleeping curve" key based on the interface shown in FIG. 5, the mode customized module 210 provides an interface shown as FIG. 11 or FIG. 12 (if the interface shown as FIG. 11 is provided, a new interface for setting temperature curve pops up; if the interface shown as FIG. 12 is provided, the original interface displays the interface for setting temperature curve); when user selects and clicks a "operation time setting" key based on the interface shown in FIG. 5, the mode customized module 210 provides interfaces shown as FIG. 13.

The interface shown in FIG. 6 includes a movably touch-bar 31, temperature/humidity setting value can be adjusted through moving and touching the movably touch-bar 31, such as, moving toward "+" symbol can gradually add the temperature/humidity setting value according to a preset magnitude, moving toward "−" symbol can gradually reduce the temperature/humidity setting value according to a preset magnitude.

The interface shown in FIG. 7 includes a sweeping control identifier 32, a sweeping horizontally area can be adjusted through moving and touching a threshold value control line S and/or E of the sweeping control identifier 32 (that is, a preset sweeping area can be defined as a area between the control line S and the control line E). When user moves and touches the control line of the sweeping control identifier 32, a sweeping angle β of the threshold value control line can be dynamically displayed (such as, shown as FIG. 8).

The interface shown in FIG. 9 includes the sweeping control identifier 32, a direction of the sweeping horizontally and orientationally can be adjusted by sliding a horizontal directional control line of the sweeping control identifier 32.

The interface shown in FIG. 10 is similar with the interface shown in FIG. 7, an operation mode of the interface shown in FIG. 10 is similar with an operation mode of the interface shown in FIG. 7, no needed to repeat herein.

In the interface shown in FIG. 11 or FIG. 12, curve parameters can be changed by moving and touching curves in a temperature-time coordinate.

When user uses the existed icons/keys (such as, the existed virtual key "zhangsan mode" or "lisi mode" in the virtual keys area of operation mode 30 shown in FIG. 4) to do an operation of preset type (such as, click or double-clicks), the mode customized module 210 determines that user sends out a customized modification command of air conditioner operation mode; or, when the mode customized module 210 detects that user does the touching operation of preset touch path, the mode customized module 210 determines that user sends out the customized modification command of air conditioner operation mode. It is to be understood that, the customized modification interface of the existed virtual keys can be similar or same with the above customized adding interface, no need to repeat herein.

When the customized deleting command of air conditioner operation (such as, a command sent out by clicking "−mode" virtual key in the virtual keys area of operation mode 30 shown in FIG. 4) sent out by user is received, the mode customized module 110 provides the interface shown in FIG. 14 first, user can select to delete the existed operation mode (such as, "zhangsan mode", "lisi mode", "wangerma mode", "zhangqian mode" and/or "sunli mode") based on the interface shown in FIG. 14, "zhangsan mode" is selected in FIG. 14 as a example, when user clicks a "deleting key", the existed "zhangsan mode" virtual key and operation parameters corresponding to the existed "zhangsan mode" virtual key are deleted.

It is to be understood that, the mode customized module 210 can also determine process types needed to be handled through another methods (such as, adding virtual key, modifying virtual key, deleting virtual key), and provides corresponding operation interfaces based on the determined process types. Such as, a mapping relation between the process types and the operation types can be preset (such as, "adding virtual key" corresponds to a click the icon, "modifying virtual key" corresponds to a double click the icon, "deleting virtual key" corresponds to a long pressing the icon (such as, click the icon continuously more than three seconds)), when user does the preset operation type (such as, click, double-click, long press) to a specific icon (such as, provided customized setting icon of the operation mode), the mode customized module 210 determines that user sends out a corresponding process type; or, a mapping relation between the process types and the preset touch path is preset, when detects that user does the touch operation of the preset touch path, the mode customized module 210 determines that user sends out the corresponding process types.

The customized mode excitation module 212 is used for controlling the air conditioner according to the operation parameters corresponding to virtual key when the customized mode excitation module 212 receives a trigger command for virtual key caused by user (such as, a virtual key named "zhangsan mode").

Embodiment 2

The mode customized module 210 can be used for generating and displaying the virtual key that its operation parameter needs to be customized (such as, the virtual key is generated, default-generated name of the virtual key and icon of the virtual key can be a preset name and key icon respectively, or a name modifying command from user can be responded to modify the default-generated name and key icon, such as, the name is modified to "wangwu mode") when receives the adding command of the virtual key sent out by user, when the customized setting command for air conditioner operation mode corresponding to the virtual key sent by user is received (such as the virtual key named "wangwu mode), customized setting interface is provided for user to customize operation parameters of air conditioner. Embodiment 1, the mode customized module 210 provides custom adding icon/key of operation mode, when user does an operation of preset type (such as, click or double-clicks) to the icon/key (such as, the "+mode" virtual key in the virtual keys area of operation mode 30), the mode customized module 210 determines that user sends out the customized adding command of air conditioner operation mode; embodiment 2, when the mode customized module 210 detects that user does the touch operation of the preset touch path, the mode customized module 210 determines that user sends out the customized setting command for air conditioner operation mode.

The mode customized module 210 can also be used for setting up the mapping relation between the customized operation parameter and the virtual key when the customized setting of the operation mode is finished by user based on customized setting interface of the operation mode.

The customized mode excitation module 212 can be used for controlling the operation of air conditioner according to the operation parameters corresponding to the virtual key when the trigger command for the virtual key (such as the virtual key named "wangwu mode") caused by the user is received.

It is to be understood that, in the second exemplary embodiment, the mode customized module 210 not only supports the adding function of virtual key, but also supports the modification function of modifying the parameters corresponding to the existed virtual key, and the deleting function of deleting the existed virtual key. Such as, when the mode customized module 210 receives the customized adding command for the air conditioner operation mode corresponding to the existed virtual key (such as virtual key named "lisi mode") sent out by user, the mode customized module 210 can be used for providing a customized modifying interface of the operation mode (such as, interfaces shown in FIGS. 5-13) for user to customize operation parameters of the air conditioner; when the mode customized module 210 receives the deleting command of the existed virtual keys sent out by user, the mode customized module 210 provides a customized deleting interface of the operation mode (such as, the interface shown in FIG. 14) for user to delete the existed virtual keys and corresponding operation parameters (such as, the virtual key named "lisi mode" and corresponding operation parameters).

It is to be understood that, in the second exemplary embodiment, the mode customized module 210 can determine process types needed to be handled through specific methods (such as, adding virtual key, modifying virtual key, deleting virtual key), and provides corresponding operation interfaces based on the determined process types. Such as, the mapping relation between the process types and the operation types can be preset (such as, "adding virtual key" corresponds to a click on the customized setting icon of the operation mode, "modifying virtual key" corresponds to double click on added or existed virtual key icon, "deleting virtual key" corresponds to a long press operation on added or existed virtual key icon (such as, a continuous click operation more than three seconds)), when user does the operation type (such as, click) according to a specific icon (such as, a customized setting icon of the operation mode), the mode customized module 210 determines that user sends out a corresponding process type command (such as, the command of adding virtual key; or, the mapping relation between the process types and the preset touch path is preset, when detects that user does the touch operation of the preset touch path, the mode customized module 210 determines that user sends out the corresponding process types.

Figure 18:
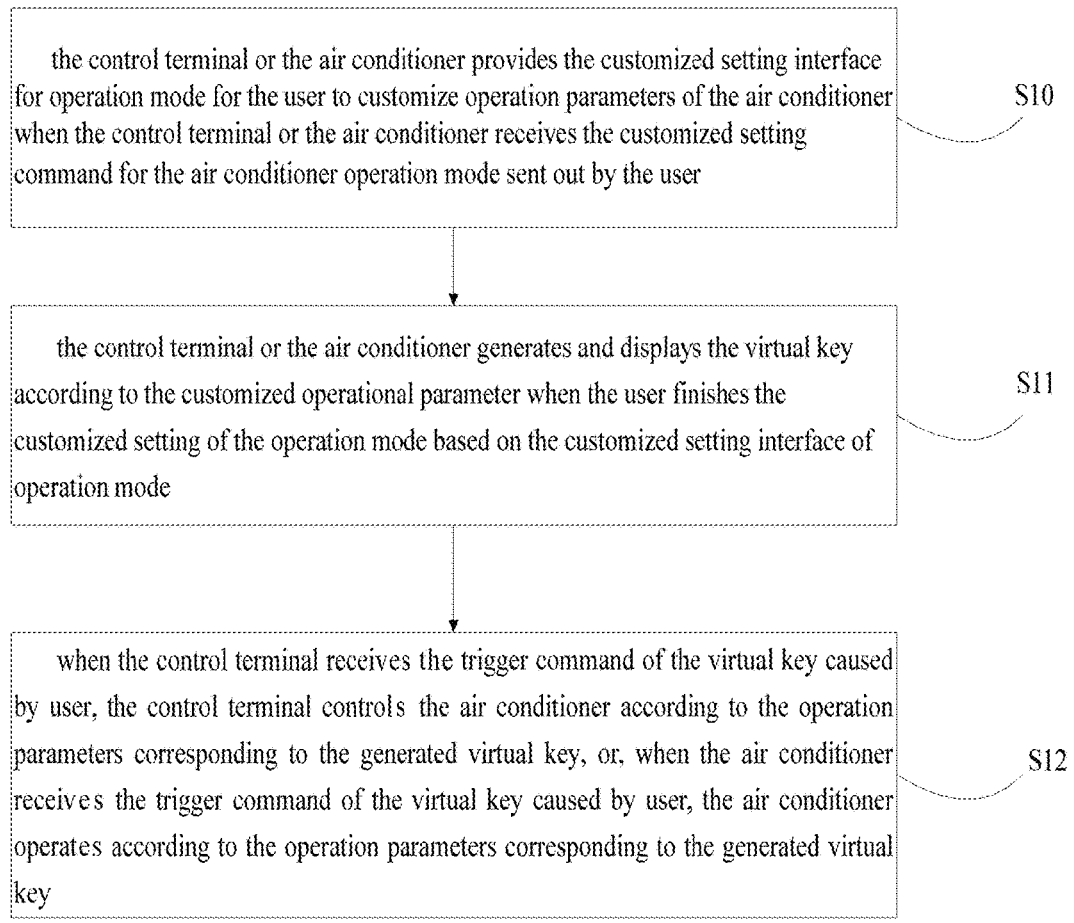
FIG. 18 is a specific flow diagram of the customized control method for air conditioner operation mode according to a first exemplary embodiment.

As shown in FIG. 18, FIG. 18 is a specific flow diagram of the customized control method for air conditioner operation mode according to a first exemplary embodiment.

Step S10, when the mode customized module 110 or the mode customized module 210 receives the customized setting command for air conditioner operation mode sent out by user, the mode customized module 110 or the mode customized module 210 provides the customized setting interface for operation mode for user to custom operation parameters of the air conditioner.

Step S11, the mode customized module 110 or the mode customized module 210 generates and displays virtual keys according to the customized operational parameters (such as, the virtual key named "zhangsan mode"), when user finishes the customized setting of the operation mode based on the customized setting interface of operation mode.

Step S12, the customized mode excitation module 212 controls the air conditioner according to the operation parameters corresponding to virtual key when the customized mode excitation module 112 receives a trigger command for the virtual key caused by user (such as, a virtual key named "zhangsan mode"); or, the customized mode excitation module 212 operates according to the operation parameters corresponding to virtual key when the customized mode excitation module 112 receives the trigger command for the virtual key caused by user (such as, a virtual key named "zhangsan mode").

Figure 19:
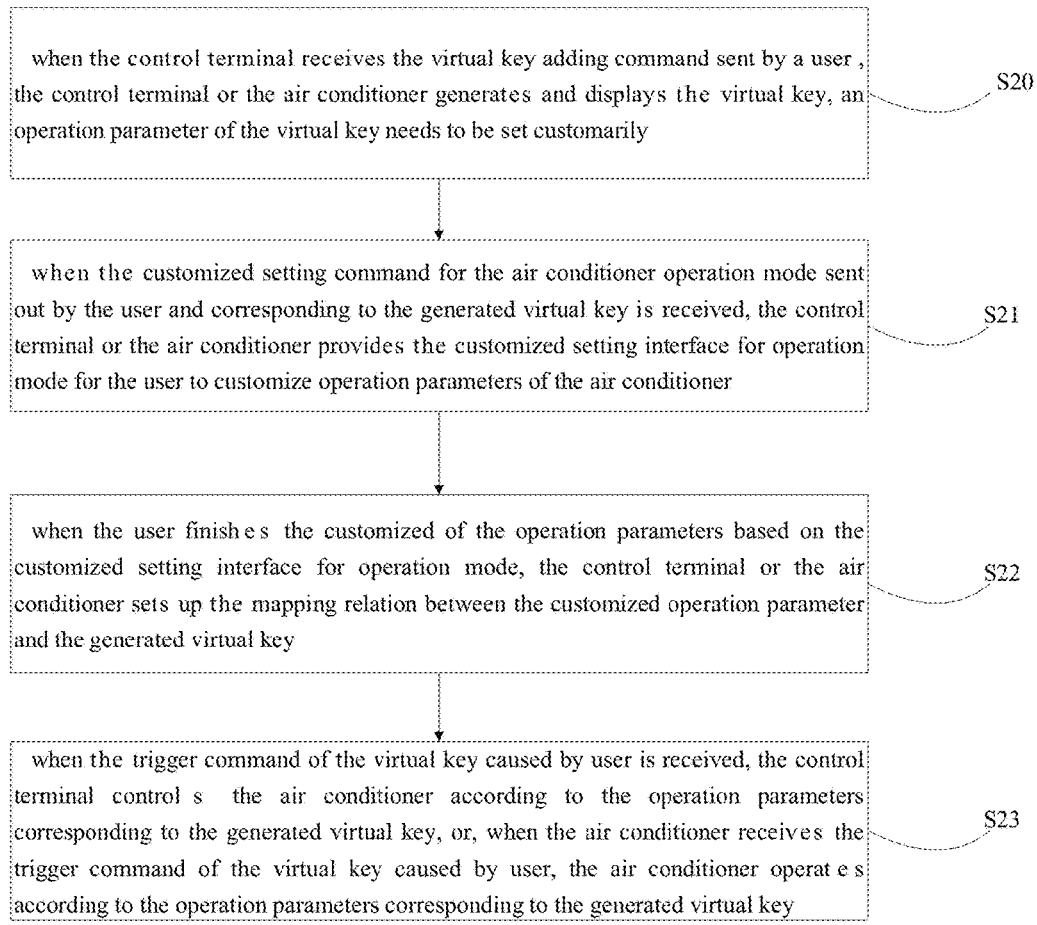
FIG. 19 is a specific flow diagram of the customized control method for air conditioner operation mode according to a second exemplary embodiment.

As shown in FIG. 19, FIG. 19 is a specific flow diagram of the customized control method for air conditioner operation mode according to a second exemplary embodiment.

Step S20, when the mode customized module 110 or the mode customized module 210 receives the customized adding command for air conditioner operation mode sent out by user, the mode customized module 110 or the mode customized module 210 generates and displays the virtual key that that its operation parameter needs to be customized (such as, the virtual key is generated, default-generated name of the virtual key and icon of the virtual key can be a preset name and key icon respectively, or a name modifying command from user can be responded to modify the default-generated name and key icon, such as, the name is modified to "wangwu mode").

Step S21, the mode customized module 110 or the mode customized module 210 provides the customized setting interface for user to customize operation parameters of air conditioner when the customized setting command for air conditioner operation mode corresponding to the virtual key (such as the virtual key named "wangwu mode) sent by user is received.

Step S22, the mode customized module 110 or the mode customized module 210 sets up the mapping relation between the customized operation parameter and the virtual key (such as, the virtual key named "zhangsan mode") based on that the customized setting of the operation mode is finished by user based on customized setting interface of the operation mode.

Step S23, the customized mode excitation module 112 controls the operation of the air conditioner according to the operation parameters corresponding to the virtual key when the trigger command for the virtual key (such as the virtual key named "wangwu mode") caused by the user is received; or, when the customized mode excitation module 112 receives the trigger command from the virtual key (such as the virtual key named "wangwu mode") caused by the user, the customized mode excitation module 112 operates according to operation parameters corresponding to the virtual key.

It is to be understood that, in another exemplary embodiment of the present disclosure, beyond the step S20, the step S21, the step S22 and the step S23, the customized control method for air conditioner operation mode can also include the following steps (not shown):

When the mode customized module 110 or the mode customized module 210 receives the customized modification command for air conditioner operation mode sent out by user and corresponding to the existed virtual key, the mode customized module 110 or the mode customized module 210 provides the customized modification interface for operation mode (such as, the interface shown in FIG. 8) for user to customize operation parameters of the air conditioner.

When the mode customized module 110 or the mode customized module 210 receives the customized deleting command for the existed virtual key (such as, the virtual key named "lisi mode") sent out by user, the mode customized module 110 or the mode customized module 210 provides the customized deleting interface for operation mode (such as, the interface shown in FIG. 8) for user to delete the existed virtual key and correspond operation parameters (such as, the virtual key named "lisi mode" and corresponding operation parameters);

when the customized mode excitation module 212 receives the trigger command for the virtual key (such as the virtual key named "lisi mode") caused by the user, the customized mode excitation module 212 controls the operation of the air conditioner according to the operation parameters corresponding to the virtual key; or, when the customized mode excitation module 212 receives the trigger command for the virtual key (such as the virtual key named "wangwu mode") caused by the user, the customized mode excitation module 212 operates according to operation parameters corresponding to the virtual key.

The embodiments above are preferably embodiments of the present disclosure, and the patent scope of the present disclosure is not limited to such embodiments, equivalent structure conversion or equivalent flow transformation based on the specification and the drawing of the present disclosure, or directly or indirectly used in other related technical field, both similarly within the protection scope of the present disclosure.

What is claimed is:

1. A control method for air conditioner operation mode customization, comprising:
    providing a setting interface for operation mode customization for an air conditioner in response to receiving a setting command for air conditioner operation mode customization;
    receiving, via the setting interface, input to customize one or more operation parameters of the air conditioner, the one or more operation parameters including at least one of a humidity, a blowing direction, or a sleeping temperature curve;
    generating and displaying a virtual key corresponding to the customized one or more operation parameters; and
    in response to receiving a trigger command through the virtual key, controlling the air conditioner to operate according to the customized one or more operation parameters corresponding to the virtual key.

2. The control method according to claim 1, further comprising:
    in response to receiving a customization modification command corresponding to the virtual key, providing a customization modification interface for receiving input to modify the customized one or more operation parameters of the air conditioner corresponding to the virtual key.

3. The control method according to claim 2, further comprising:
    in response to receiving another trigger command through the virtual key, controlling the air conditioner according to the modified customized one or more operation parameters corresponding to the virtual key.

4. The control method according to claim 1, further comprising:
    in response to receiving a deleting command corresponding to the virtual key, providing a customization deleting interface for receiving input to delete the virtual key and the customized one or more operation parameters corresponding to the virtual key.

5. The control method according to claim 1, wherein receiving the setting command includes detecting a touch operation of a preset touch path performed on a touch screen.

6. A control method for air conditioner operation mode customization, comprising:
    in response to receiving a virtual key adding command, generating and displaying a virtual key;
    in response to receiving a setting command for air conditioner operation mode customization corresponding to the virtual key, providing a setting interface for operation mode customization for customizing one or more operation parameters of an air conditioner, the one or more operation parameters including at least one of a humidity, a blowing direction, or a sleeping temperature curve;
    in response to receiving input on the setting interface to customize the one or more operation parameters, setting a mapping relationship between the customized one or more operation parameters and the virtual key; and
    in response to receiving a trigger command through the virtual key controlling the air conditioner to operate according to the customized one or more operation parameters corresponding to the virtual key.

7. The control method according to claim 6, further comprising:
    in response to receiving a customization modification command corresponding to the virtual key, providing a customization modification interface for receiving input to modify the customized one or more operation parameters of the air conditioner corresponding to the virtual key.

8. The control method according to claim 7, further comprising:
    in response to receiving another trigger command through the virtual key, controlling the air conditioner according to the modified customized one or more operation parameters corresponding to the virtual key.

9. The control method according to claim 6, further comprising:
in response to receiving a deleting command corresponding to the virtual key, providing a customization deleting interface for receiving input to delete the virtual key and the customized one or more operation parameters corresponding to the virtual key.

10. A control apparatus comprising:
a memory; and
a processor coupled to the memory and configured to:
provide a setting interface for operation mode customization for an air conditioner in response to receiving a setting command for air conditioner operation mode customization;
receive, via the setting interface, input to customize one or more operation parameters of the air conditioner, the one or more operation parameters including at least one of a humidity, a blowing direction, or a sleeping temperature curve;
generate a virtual key corresponding to the customized one or more operation parameters and display the virtual key on a display screen;
in response to receiving a trigger command through the virtual key control the air conditioner to operate according to the customized one or more operation parameters corresponding to the virtual key.

11. The control apparatus according to claim 10, wherein the processor is further configured to, in response to receiving a modification command corresponding to the virtual key, provide a customization modification interface for receiving input to modify the customized one or more operation parameters of the air conditioner corresponding to the virtual key.

12. The control apparatus according to claim 11, wherein the processor is further configured to, in response to receiving another trigger command through the virtual key, control the air conditioner according to the modified customized one or more operation parameters corresponding to the virtual key.

13. The control apparatus according to claim 10, wherein the processor is further configured to, in response to receiving a deleting command corresponding to the virtual key, provide a customization deleting interface for receiving input to delete the virtual key and the customized one or more operation parameters corresponding to the virtual key.

14. A control apparatus comprising:
a memory; and
a processor coupled to the memory and configured to:
in response to receiving a virtual key adding command, generate a virtual key, and display the virtual key on a display screen;
in response to receiving a setting command for air conditioner operation mode customization corresponding to the virtual key, provide a setting interface for operation mode customization for customizing one or more operation parameters of an air conditioner, the one or more operation parameters including at least one of a humidity, a blowing direction, or a sleeping temperature curve;
in response to receiving input on the setting interface to customize the one or more operation parameters set a mapping relationship between the customized one or more operation parameters and the virtual key; and
in response to receiving a trigger command through the virtual key, control the air conditioner to operate according to the customized one or more operation parameters corresponding to the virtual key.

15. The control apparatus according to claim 14, wherein the processor is further configured to, in response to receiving a modification command corresponding to the virtual key, provide a customization modification interface for receiving input to modify the customized one or more operation parameters of the air conditioner corresponding to the virtual key.

16. The control apparatus according to claim 15, wherein the processor is further configured to, in response to receiving another trigger command through the virtual key, control the air conditioner according to the modified customized one or more operation parameters corresponding to the virtual key.

17. The control apparatus according to claim 14, wherein the processor is further configured to, in response to receiving a deleting command corresponding to the virtual key, provide a customization deleting interface for receiving input to delete the virtual key and the customized one or more operation parameters corresponding to the virtual key.

* * * * *